United States Patent [19]

Seth-Smith et al.

[11] Patent Number: 4,866,770

[45] Date of Patent: Sep. 12, 1989

[54] METHOD AND APPARATUS FOR COMMUNICATION OF VIDEO, AUDIO, TELETEXT, AND DATA TO GROUPS OF DECODERS IN A COMMUNICATION SYSTEM

[75] Inventors: Nigel Seth-Smith, Scarborough; Cameron Bates; Samson Lim, both of Toronto; William van Rassel, Willodale; Robert Yoneda, Toronto; Keith Lucas, Richmond Hill, all of Canada

[73] Assignee: Scientific Atlanta, Inc., Atlanta, Ga.

[21] Appl. No.: 896,261

[22] Filed: Aug. 14, 1986

Related U.S. Application Data

[63] Continuation-in-part of Ser. No. 883,310, Jul. 8, 1986, abandoned.

[51] Int. Cl.⁴ .............................................. H04L 9/00
[52] U.S. Cl. ....................................... 380/20; 380/14; 380/21
[58] Field of Search .................. 358/145, 147, 349; 380/10, 14, 20, 21

[56] References Cited

U.S. PATENT DOCUMENTS 3,639,686  2/1972  Walker et al. ...................... 380/20
3,777,053 12/1973  Wittig et al. ....................... 380/20

(List continued on next page.)

OTHER PUBLICATIONS

Comm. Tech. Jul. 1984, pp. 28–32 and 36, Weschselberger (II) Encyprtion applications in Cable TV arena.
S.M.P.T.E. Journal 93 (1984) Oct., No. 10, "NTSC and MAC Television Signals in Noise and Interference Environments" by Chouinard et al.–pp. 30–942.
CCIR Study Groups, "Satellite Transmission of Multiplexed Analogue Component (MAC) Television Signals", Sep. 23, 1983, Documents 10–11S/33, 39,62, Temp./10–11S–9.
SMPTE Journal, Nov. 1984, "B-MAC: An Optimum Format for Satellite Television Transmission" by John D. Lowry, pp. 1034–1043.
Zenith Radio Corporation, "The Phonevision System of Subscription Television" of Jul. 25, 1966, FCC Docket No. 11279.

Primary Examiner—Salvatore Cangialsoi
Attorney, Agent, or Firm—Banner, Birch, McKie & Beckett

[57] ABSTRACT

A communication system enabling transmission of individual subscriber teletext messages, audio and video to individual subscribers and permitting group communications of audio, video, teletext and data information from a single central subscriber location, such as a corporate head office to a plurality of satellite offices, such as field or sales offices of the corporation, is disclosed. A composite signal including the information to be transmitted as well as system wide, individual decoder and group decoder control signals is transmitted. The system-wide control signals include data germane to operation of each of the decoders of this system, including key information needed to decode the composite signal. The system-wide control data is transmitted at a first relatively high frequency. The group decoder information includes information permitting individual groups of decoders to receive information portion of the composite signal being transmitted at a given time. In this way, for example, an audio and video signal can be transmitted at a convenient time from a central location to a number of satellite locations. The group decoder control signal can also include signals used by the decoder to cause recording of the signals, e.g., by activating a video cassette recorder or the like. The group control signals also include signals defining service packages to which the individual groups may be assigned. The individual decoder messages include information relevant to the operation of each individual decoder, including further key information needed to decode the composite signal, and group assignment codes.

25 Claims, 22 Drawing Sheets

U.S. PATENT DOCUMENTS

| | | | |
|---|---|---|---|
| 3,789,131 | 1/1974 | Harney | 380/20 |
| 4,112,464 | 9/1978 | Guif et al. | 380/20 |
| 4,245,245 | 1/1981 | Matsumoto et al. | 380/20 |
| 4,292,650 | 9/1981 | Hendrickson | 380/20 |
| 4,323,921 | 4/1982 | Guillou | 358/147 |
| 4,323,922 | 4/1982 | den Toonder et al. | 380/20 |
| 4,337,483 | 6/1982 | Guillou | 358/147 |
| 4,393,404 | 7/1983 | Cox et al. | 358/147 |
| 4,484,217 | 11/1984 | Block et al. | 358/349 |
| 4,531,020 | 7/1985 | Weschselberger et al. | 380/21 |
| 4,531,021 | 7/1985 | Bluestein et al. | 380/21 |
| 4,536,791 | 8/1985 | Campbell et al. | 380/10 |
| 4,600,921 | 7/1986 | Thomas | 380/20 |
| 4,605,961 | 8/1986 | Frederiksen | 380/14 |
| 4,613,901 | 9/1986 | Gilhousen et al. | 380/20 |
| 4,618,888 | 10/1986 | Nohara et al. | 380/20 |
| 4,623,920 | 10/1986 | Dufresne et al. | 380/10 |
| 4,636,854 | 11/1987 | Crowther et al. | 380/20 |
| 4,642,688 | 2/1987 | Lowry et al. | 380/20 |
| 4,649,419 | 3/1987 | Arragon et al. | 380/20 |
| 4,651,205 | 2/1987 | Crowther | 380/14 |
| 4,682,360 | 7/1987 | Frederiksen | 380/10 |
| 4,694,491 | 9/1987 | Horne et al. | 380/20 |
| 4,739,510 | 4/1988 | Jeffers et al. | 380/20 |

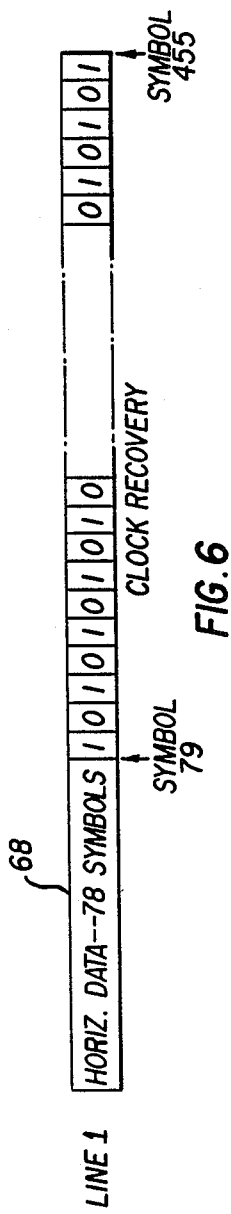
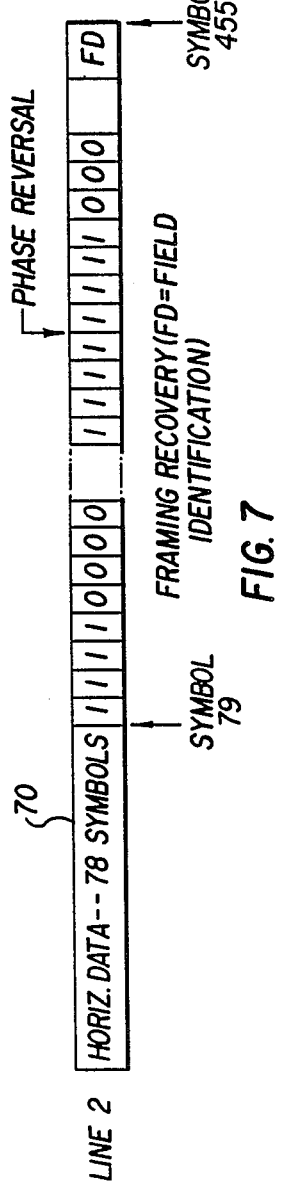
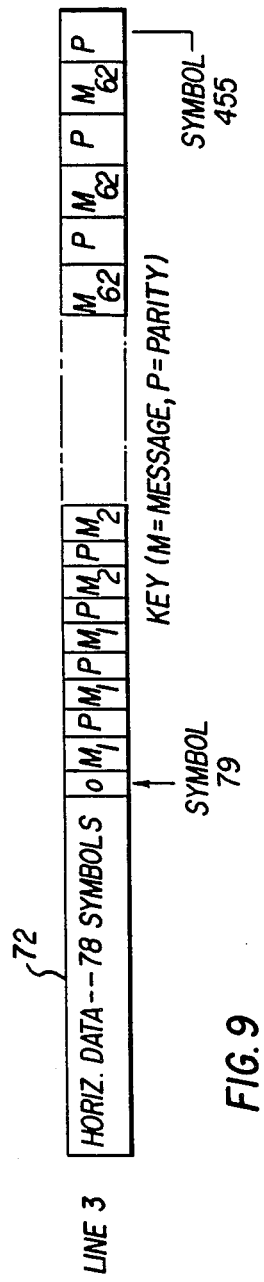

| | |
|---|---|
| 1 | FULL FIELD MODE SELECT |
| 2 | KEY SOURCE CODE |
| 1 | ENCRYPTED PROGRAM |
| 2 | SEGMENT ID |
| 8 | PROGRAM TIER NUMBER |
| 4 | SERVICE TIER NUMBER |
| 12 | PROGRAM NUMBER |
| 8 | COST OF CURRENT PROGRAM |
| 14 | DECRYPTION KEY (1ST SEGMENT) |
| 1 | FAST SCRAMBLING SELECT |
| 9 | DECRYPTION KEY (2ND SEGMENT) |
| $\overline{62}$ | |

FIG.10

PACKET A OF
SYSTEM DATA

| Bits | Field |
|---|---|
| 32 | DECRYPTION KEY (3^RD SEGMENT) |
| 8 | BLACKOUT CODE |
| 1 | PROGRAM COST (MSB) |
| 5 | CHECK BITS |
| 1 | FINGERPRINT TRIGGER |
| 1 | IMPULSE ENABLE |
| 5 | AUDIO/DATA CHANNEL USAGE |
| 3 | PROGRAM RATING |
| 2 | ACTIVE VIDEO USAGE |
| 1 | GENERAL MESSAGE |
| 1 | SOURCE SWITCH REQUEST |
| 1 | SCRAMBLED PROGRAM |
| 1 | TRACKED PROGRAM |

$\overline{62}$

FIG. 11

PACKET B OF SYSTEM DATA

PACKET C OF SYSTEM DATA

TELETEXT HEADER

TEXT LINE

4,866,770

METHOD AND APPARATUS FOR COMMUNICATION OF VIDEO, AUDIO, TELETEXT, AND DATA TO GROUPS OF DECODERS IN A COMMUNICATION SYSTEM

This application is a continuation-in-part of U.S. application Ser. No. 883,310 filed July 8, 1986, now abandoned i favor of Ser. No. 253,320, filed Sept. 30, 1988, in the name of negel Seth-Smith et. al and entitled: "Communications Format for a Subscription Television system permitting transmission of individual Messages to subscribers".

FIELD OF THE INVENTION

This invention relates to communication of video, audio, teletext, and data from a central transmitter to groups of decoders. More particularly, this invention relates to a method and apparatus for communication of these types of information signals between, for example, a head office and a number of district offices of a corporation. The system may be used by a non-governmental satellite company which arranges private communications for corporations, for example, between their head and remote offices, and can provide varying types of signal communication therebetween.

BACKGROUND, OBJECTS AND SUMMARY OF THE INVENTION

The most pertinent prior art with respect to the present invention known to the inventors relates to subscription television systems in which communication of billing data to individual subscribers of the system is made possible. See U.S. Pat. No 4,487,217 to Block et al., which discloses a subscription television system in which all billing calculations are carried out at the decoder, that is, at the individual subscriber's location. When a subscriber makes a payment, e.g., by simply mailing a check to the broadcaster, the broadcaster then sends a message which is detected by that particular decoder and used by it to update the user's credit and-/or account balance information The decoder then controls whether the user is to have access to a particular program or not in accordance with this billing information, and possibly also in accordance with other sorts of access controls transmitted by the broadcaster For example, each program transmitted may include an indication that it belongs to a particular "tier" or class of programs. The decoder then permits access to the program if programs of that tier had previously been authorized.

The Block et al patent also discloses that teletext data, that is, textual information relating to stock market reports and the like, could also be transmitted using this system. However, the teletext data discussed in the Block et al patent appears to be system-wide data, that is, data relevant to all subscribers of the system more or less equally. The Block et al. patent does not teach any way in which, for example, an individual broadcaster may send a chosen subscriber a personal message other than billing update data, as above.

"Specification of Standards for Broadcast Teletext Signals," a document published by the British Broadcasting Corporation et al. in September, 1976, describes the teletext broadcasting system in effect in the United Kingdom. According to this system, teletext information such as closed-captioned programming is available for the hearing impaired. According to this system, as understood by the applicants, the subscriber simply depresses a button on a key pad comprised by the decoder, and the decoder then selects alphanumeric data which is transmitted during the vertical blanking interval of the standard television signal. The decoder can then add this closed-captioned textual material directly to the video screen, so that it can be seen by the hearing impaired. Again, however, this material is transmitted system-wide, and there is no provision made for transmission of individual messages to individual subscribers.

In two co-pending applications assigned to the assignee of the present application Serial Nos. 883,301 filed July 8, 1986, and 883,310, filed July 8, 1986, there is described an improved subscription television system. According to the inventions described therein, individual teletext messages may be transmitted to individual subscribers. The manner in which this is done is described below. For purpose of understanding the present invention, it may be stated that the signal which is transmitted from the broadcaster includes messages which are directed to individual decoders. The decoders recognize that a message has been transmitted to them. They then subsequently select teletext information transmitted as part of the composite audio, video, teletext and data signal and display this to the individual subscriber. That system also includes transmission of system-wide control data, that is, data which is relevant to operation of all the decoders, such as identification of the video program being transmitted at any particular time.

One limitation on the communication system described in these applications is that individual decoders must be individually authorized by means of messages sent individually to them to receive certain information, specifically in order to receive teletext messages. While this is generally feasible, there is a limitation on the system throughput, as each decoder must be addressed individually.

The present invention recognizes that in some cases it may be desirable for an individual transmitter, for example, located at a corporate head office, to be provided with the capability to simultaneously transmit a single message, which might include video, audio, teletext or utility data to be transmitted, to a number of individual local offices. Preferably, the selection of the offices and of the information signal to be transmitted can be made individually at the transmitter location, either by corporate officials or by an intermediate service company. In this way significantly improved flexibility is provided.

For example, suppose a corporation occasionally wishes to send the identical message to all of its branch laboratories, research stations, service offices and sales offices. The message may comprise video, audio, teletext or utility data. [The distinction between teletext and data in this context is that "teletext" refers to textual information solely for display on a CRT or the like, whereas "utility data" refers to ordinary RS-232 data, i.e. to inter-computer communications]. At other times it may be desirable to send a directive only to the research facilities, at another time to the marketing groups, and so on.

In order to do so it is an object of the invention to provide a so called "commercial decoder" which is supplied to all locations with which such communications is desired. At the central location, that is, at the corporate headquarters in this example, a control device is provided to assign individual decoders to groups of decoders, and to define which services i.e., audio, video, teletext and/or utility data - each group is to receive at any given time. Individual signals may be sent to each of the decoders identifying its present group assignment. Thereafter, an indication of the services which the decoders of each group are to decode and present to the users is transmitted regularly. In effect, the decoders themselves determine which services are to be decoded from the transmitted signal and made available to the users. In this way, simply by reconfiguring the groups and/or the "service package", the central transmitter can control which offices receive the various information signal portions of the transmitted "composite signal", all in a highly efficient, flexible, and orderly fashion.

There are a number of constraints on the design of the system. Briefly stated, it is an object of the invention to permit the following capabilities:

Because the cost of transponder time varies over the 24 hours of each day, it should be possible to transmit messages when desired, i.e. during the night, for example. This requires a means for remote actuation of a recording device.

The service should be controlled by the network user, that is by the corporate headquarters only, not by the decoder. In particular the network user expects that all the receivers will act in an identical way. This is in contrast to the subscription television use of the communications system of the invention, in which the individual subscriber selects particular programs.

The revenue earned by the satellite owner should be derived only from a network user, not from the individual decoder users, in order to simplify bookkeeping and the like. By comparison, in the subscription television system, revenue is derived from each individual user.

It seems likely that some customers may be one time or very sporadic service users. It should be possible to allow new customers to be added readily, without affecting service to existing customers.

It should also be recognized that the decoder will typically remain chained to a single transponder for a relatively long periods of time, as opposed to the individual subscriber system, in which the user must be allowed to rapidly change channels, as one does with conventional television set. Therefore "lockup," that is, reception of the signal after channel change or power up, may be permitted to consume several seconds in the case of the commercial decoders.

As described above, the network user should be permitted to reclassify those of his decoders which receive given services at given times, i.e., to change their groups, and this should be readily alterable for convenience' sake.

Allocation of the services, whether by the network user or by an intermediate satellite service company, should be possible at a single central site. Furthermore, network planning and decoder group assignment should be permitted on the spot and be implemented by software, as opposed to repairing laborious hardware modifications, which would take advance planning and be more costly.

As indicated above, the prior art suggests that individual decoders can be addressed for transmission of billing information. It would also be desirable if individual user messages, this including video, audio, teletext and data, could be transmitted to individual users or groups of users so as to provide an additional communications facility not previously made available. If this is to be done, there are several criteria which must be met. Paramount among these is security; preservation of the secrecy of the message and its availability only to the particular addressee is of utmost importance.

It is therefore stated broadly to be an object of the invention to provide a communication format and system in which individual groups of decoders can be addressed in a convenient and readily alterable fashion, and in which particular classes of service can be allowed to each decoder in the group. More particularly, it is an object of the invention to provide a ready means for establishing, at a transmitter location, the identity of decoders in a particular group, and for transmitting at regular intervals an indication of the service to be made available to the decoders of each group, whereby ready reallocation of services is possible.

In assigning individual decoders to groups so as to thereafter be able to readily redefine the services allowed to each of the decoders, it is desirable that "historical" records of the group assignments for each of the decoders be maintained, such that plural "normal" assignments are available, and so that selection between several common arrangements is readily possible and does not involve excessive operator input. In order to do so, it is desirable that a "data base" be maintained concerning each of the individual decoders, whereby such updated records can be readily provided and changes can readily be made, and to do so is an object of the invention.

It is a further object of the invention to provide a communication system in which communication of audio, video, teletext and data to groups of decoders can be accomplished in an extremely secure and tamper-proof fashion.

It is a further object of the invention to provide a communications format and system in which individual text messages can be transmitted to individual subscribers, yet in which a network user at a transmitter location can send identical messages to groups of decoders, such that groups of decoders can receive a single text message transmitted simultaneously, while at the same time individual users can be addressed individually, using the same overall transmission format and transmitter hardware.

It is a further object of the invention to provide a system in which the network user can effectively control what is received by an individual decoder, and in which such control can be readily altered by an operator at the transmitter location without requiring any hardware modifications to any decoder or the equivalent.

It is a further object of the invention to provide the transmitter with the capability to activate a video cassette or other recorder at the decoder location, so that a message sent at night (to take advantage of lower transmission costs) can be recorded automatically and be available to be viewed when convenient.

The above needs of the art and objects of the invention are satisfied by the present invention, which comprises a communications format and system in which an operator at a central transmitter location assigns individual decoders in a system to groups. An "addressed packet" addressed to the individual decoder identifying its particular group assignment may be transmitted. Thereafter, on a regular basis, control signals indicating which services (i.e. audio, video, teletext and/or data) each group is permitted to decode are transmitted. Each of the decoders of the particular group is enabled to decode those particular services and no others.

More particularly, each decoder is provided with a "user address" and a "secret serial number". Each decoder is designated to be part of one or more particular groups by storing one or more group codes in its memory. There may be up to 255 unique group codes used by a network user. For example, a corporation may use the group codes in order to subdivide its operation, e.g. factory decoders are group 32, sales office decoders group 37, and so on. All decoders assigned to the same group will receive exactly the same service.

A "service" is defined as a particular portion of the composite audio, video, teletext and utility data signal used according to the preferred embodiment of the invention. As noted, the services may be video, utility data, audio, and/or teletext.

A "service package" is defined as a set of services. There may be up to some maximum number of service packages available at any one time. Typically, a service package is purchased by a customer of the network operator for use in distributing information to the groups. Two service packages may use the same service. For example, a French speaking sales group would receive the same video but different audio than would an English speaking sales group. Thus these two service packages would both include the same video service.

The composite signal includes a set of system-wide control information, or "system data", which is used by each decoder to control various system level operations. A portion of the "system data" is the so-called "commercial control sequence". This comprises a number of commands, each defining the current assignment of services to groups. Membership in a group is transmitted to the decoder by means of an individually addressed message which is transmitted only sporadically. By comparison, a portion of the commercial control sequence is transmitted once per "cryptocycle", that is, each time a complete set of the system data is transmitted.

All of the control data is preferably encrypted, and in general is transmitted a multiplicity of times for ensuring the accuracy of its decoding and for ensuring its security. Typically, each element of the system data, including each portion of the commercial control sequence, is transmitted in identical format five times in a row during each cryptocycle.

Transmission of teletext may involve several additional features For example, certain teletext information may be repeatedly transmitted by the transmitter, in order to provide certain frequently used information, referred to as "templates." The templates may be used by the decoder to complete a message in both the commercial decoder and the individual decoder embodiments of the invention. In either case, the decoder's microprocessor stores certain data which varies with respect to the individual decoder, and completes the message by inserting this "user-specific" data into the template provided by the transmitter.

In general, the commercial decoder is controlled completely from the transmitter, that is, no input device is provided to the decoder other than a simple on/off switch. Indeed, the message transmitted by the transmitter may also cause the decoder to output an external signal, e.g., to activate a video cassette recorder, to record a message sent from the head office of a corporate transmitter or the like. On the other hand, in some embodiments, user input may be desirable, e.g., to select templates or the like, and such is accordingly also within the scope of the invention.

The same composite communication signal format is used in the commercial decoder and in the individual subscriber embodiments of the invention. In each, the signal format includes transmission of a complete set of system data over a number of fields, sixteen in the preferred embodiment. Each field is transmitted as a number of lines, and contains a horizontal blanking interval portion, which includes the audio, a vertical blanking interval which includes system data, used to transmit data relevant to the operation of all the decoders in the system, addressed packet data used to send individual messages to individual decoders, and teletext if any, and a video portion, which in the preferred embodiment is encoded according to the so-called "B-MAC" format, which is discussed below. Both the system data and the addressed packets as mentioned above include key information which must be used by the decoder to decode the various encrypted portions of the signal. In this manner a very high degree of security is provided.

In the preferred embodiment, the system data is extensively protected by means of additional error correction characters and by duplication, such that it is very reliably received. Due to this duplication, the system data required for operation of the system cannot be transmitted in a single line of a single field. Therefore, the system data is divided into a number of groups for separate transmission in plural fields; in the preferred embodiment, this number is three. The system data transmitted in a given field is also duplicated and transmitted repetitively a predetermined number of times, five in a preferred embodiment, such that majority logic can readily be used to ensure correct receipt of the system data.

The system data includes in addition to the control data described above an encryption key which is used in the decoder to decrypt portions of the video, audio and teletext information. By virtue of the very high degree of security provided by the duplicative transmission and error correction facility, system data is received with high reliability. The key is changed at the completion of each "cryptocycle" that is, upon complete transmission of the system data, to further protect against its illegal duplication.

According to the present invention the commands making up the commercial control sequence are transmitted as part of the system data, so that these similarly are transmitted and received with a high degree of reliability. In the preferred embodiment, one command is transmitted per set of system data, so that transmission of the complete commercial command sequence extends over a number of cryptocycles. The received commands are stored by the decoders until the complete sequence has been received, indicated by transmission of a START command, at which time all commands are implemented.

BRIEF DESCRIPTION OF THE DRAWINGS

The invention will be better understood if reference is made to the accompanying drawings, in which:

FIG. 6 shows in some additional detail the clock recovery data carried in line 1 of the vertical blanking interval;

FIG. 7 shows in additional detail the framing recovery data carried in line 2 of the vertical blanking interval;

FIG. 9 shows schematically the arrangement of line 3 of the vertical blanking interval, during which the system data is transmitted;

FIG. 10 shows in detail the data carried in the first packet, packet A, of the system data;

FIG. 11 shows in detail the data carried during the second packet, packet B, of the system data;

DESCRIPTION OF THE PREFERRED EMBODIMENTS

Figure 1:
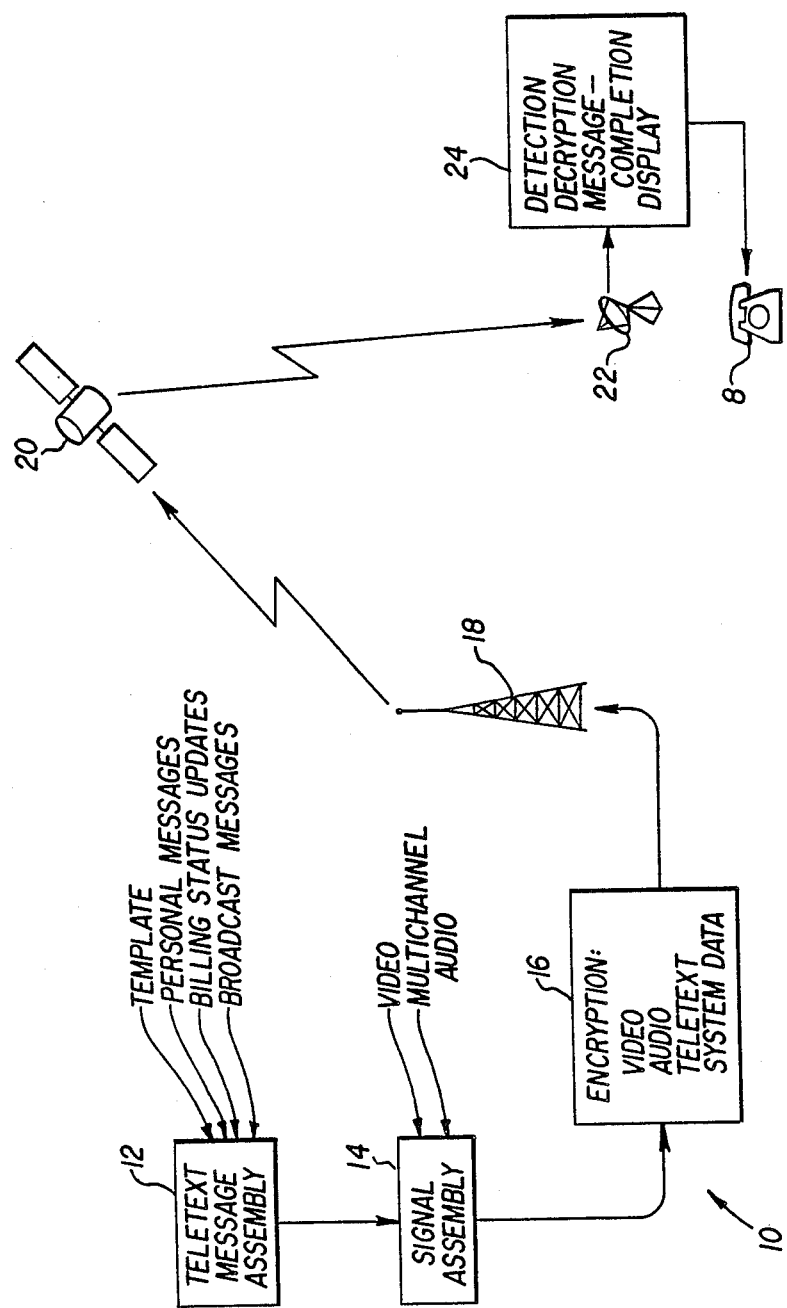
FIG. 1 shows an overall view of a communication system according to the invention configured for communication of individual messages to subscribers.

As described above, the present invention relates to a communications system wherein various sorts of user information, including audio, video, teletext and data, may be transmitted from a first location such as a company's head office, to one or a number of other locations such as its field offices. This may be done by a transmitter controlled directly by employees of the corporation, or by virtue of an intermediary who merchandises this service to the corporations involved. (Obviously other sorts of entities can use the communication facility provided by the invention, such as governmental bodies and the like, and the invention is not to be limited to corporations per se.) Furthermore, this capability is to be provided in a communication system which additionally provides other capabilities, in particular transmission of subscription television signals to individual subscribers, and transmission of individual teletext messages to those subscribers. For reasons of hardware design and construction economies and for economies provided by use of the same satellite transponders and the like, it is clearly desirable that the corporate communications facility just described be provided in a system using essentially the same transmitter and decoder hardware and obviously the same satellite as used for transmission of the individual subscriber services referred to above. Therefore, to give a clear picture of the system in which the present invention is used, the present application discusses the individual subscriber communications format and method thoroughly, so as to provide a full disclosure of the system claimed. Further details can be found in co-pending applications Ser. Nos. 883,301, filed and July 8, 1986 and 883,310, filed July 8, 1986, although these are not deemed necessary to understanding of the invention claimed herein, which as noted relates to the "commercial decoder" and its use in the overall communications system.

As mentioned above, the main objects of the commercial decoder system are to provide secure communication of a wide variety of information signals between, for example, one or more head offices and one or more branch offices simultaneously. Moreover, it is desired that different types of communications be sent to different group of locations, and that the types of information signal sent to each location can be varied as need be. In this manner unprecedented flexibility in corporate communications is provided. Moreover, it is an object of the invention to provide ready reconfiguration of the groups which receive particular data, that is, to permit ready re-allocation of various services (i.e., video, audio, teletext and data services) to each of the decoders. It is still a further object of the invention to provide all this in a very secure, tamper-proof and cost-effective manner.

These objects of the invention are achieved by the present system, which is described in the following text, of which the following is a Table of Contents, and in which reference is made to the accompanying drawings.

| TABLE OF CONTENTS | | Page |
|---|---|---|
| A. | System Overview | 19 |
| B. | The Communications Format Employed | 24 |
| | 1. Overview | 24 |
| | 2. The Horizontal Blanking Interval | 26 |
| | 3. The Vertical Blanking Interval | 28 |
| | 4. Line 1 | 30 |
| | 5. Line 2 | 30 |
| | 6. Line 3 | 31 |
| |    a. The Cryptocycle | 31 |
| |    b. Line 3 Format | 32 |
| |    c. The Distinction between System-Wide and Individual-Decoder Data | 33 |
| |    d. The System Data Packets | 35 |
| |       (i) Packet A | 35 |

-continued

TABLE OF CONTENTS

|   |   |   | Page |
|---|---|---|---|
|   |   | (ii) Packet B | 39 |
|   |   | (iii) Packet C | 41 |
|   | 7. | Transmission of Subscriber Messages | 42 |
|   |   | a. The Addressed Packets | 43 |
|   |   | b. Teletext Communication | 46 |
|   |   | c. Line Formats | 48 |
| C. | The Commercial Decoder |   | 51 |
|   | 1. | Overview | 51 |
|   | 2. | System Uses | 53 |
|   | 3. | Definitions | 55 |
| D. | Teletext Message Processing |   | 56 |
|   | 1. | Message Origination | 56 |
|   | 2. | Partition of Decoder Functions | 62 |
| E. | Use of System Data for Control of Commercial Decoders |   | 67 |
|   | 1. | Description of Commercial Control Commands | 69 |
|   | 2. | Command Syntax | 73 |
|   | 3. | Buffering of Commands | 76 |
|   |   | a. Double Buffering | 77 |
|   |   | b. Command Sequences | 78 |
|   |   | c. Bundles | 78 |
| F. | Decryption |   | 81 |
| G. | Further Advantages |   | 82 |

A. System Overview

FIG. 1 shows in highly schematic form a communication system suitable for achieving some of the objects of the system of the invention, that is, for communication of message to individual subscribers in a subscription television system listed above. At a first transmitter location, indicated generally by the numeral 10, the teletext message sequence is first assembled as indicated at 12. This may include standard items such as templates, that is, data which provides a format to which user-specific information can be added by a decoder to personalize a message; personal messages directed to individual users; billing status updates, that is, billing information generated in response to a telephone call or letter from the subscriber to the broadcaster; and broadcast messages, that is, messages which are out of the ordinary course of business, but which are transmitted to substantially all or a predetermined subcategory of subscribers (for example, that there is some general danger of which all should be aware).

At 14, the teletext information from item 12 is assembled together with video information, and in a preferred embodiment of the system of the invention, with multichannel audio. As will be detailed below in connection with FIGS. 3 and 4, six channels of digital audio are provided in the system of the invention. These are transmitted during the horizontal blanking interval and may be provided on a pay-per-listen basis, whereby the broadcaster can generate additional revenue from audio transmission.

At 16, the assembled teletext, video and audio signal is encrypted. The signal transmitted includes what are referred to as addressed packets, which among other functions alert an individual subscriber's decoder that a message has been sent to it, and teletext information. The subscriber identification portion of the addressed packet is transmitted in clear text, that is, is not encrypted, so that it can be detected without decryption. The addressed packet further contains certain cipher key information used in decrypting system control data. In turn the system control data is required for decryption of encrypted user messages. Thus, a double level of security is provided, as only the individual decoder can even receive the message, and only that decoder can use the system data which it also must receive to decode the individual message, which is subsequently sent. The composite, encrypted signal is transmitted as indicated at 18. It may travel via a satellite 20, by a landline or a combination of both to receiving antenna 22. It is there passed to a decoder 24 which comprises means for detecting the signal, decrypting the encrypted portions of it, completing any messages requiring any subscriber-specific data, such as billing status information and the like, and display of the received messages. Of course, the decoder also permits user selection of the decrypted audio and video information, and includes means for maintaining the billing history information related to a specific user, for restricting access of individuals to the video signal, prevention of impulse purchase of programs by those not authorized to do so, and so on, all as detailed below.

The system of the invention is completed by means permitting the user to communicate with the broadcaster. Ordinarily, the user will only need to communicate with the broadcaster sporadically, for example, to request addition of a service, or to pay a bill or the like. Conventional communications facilities such as the telephone system or the mails are suited for this function, as indicated schematically at 8. In this way, no uplink facility at the user's station need be provided.

Figure 1A:
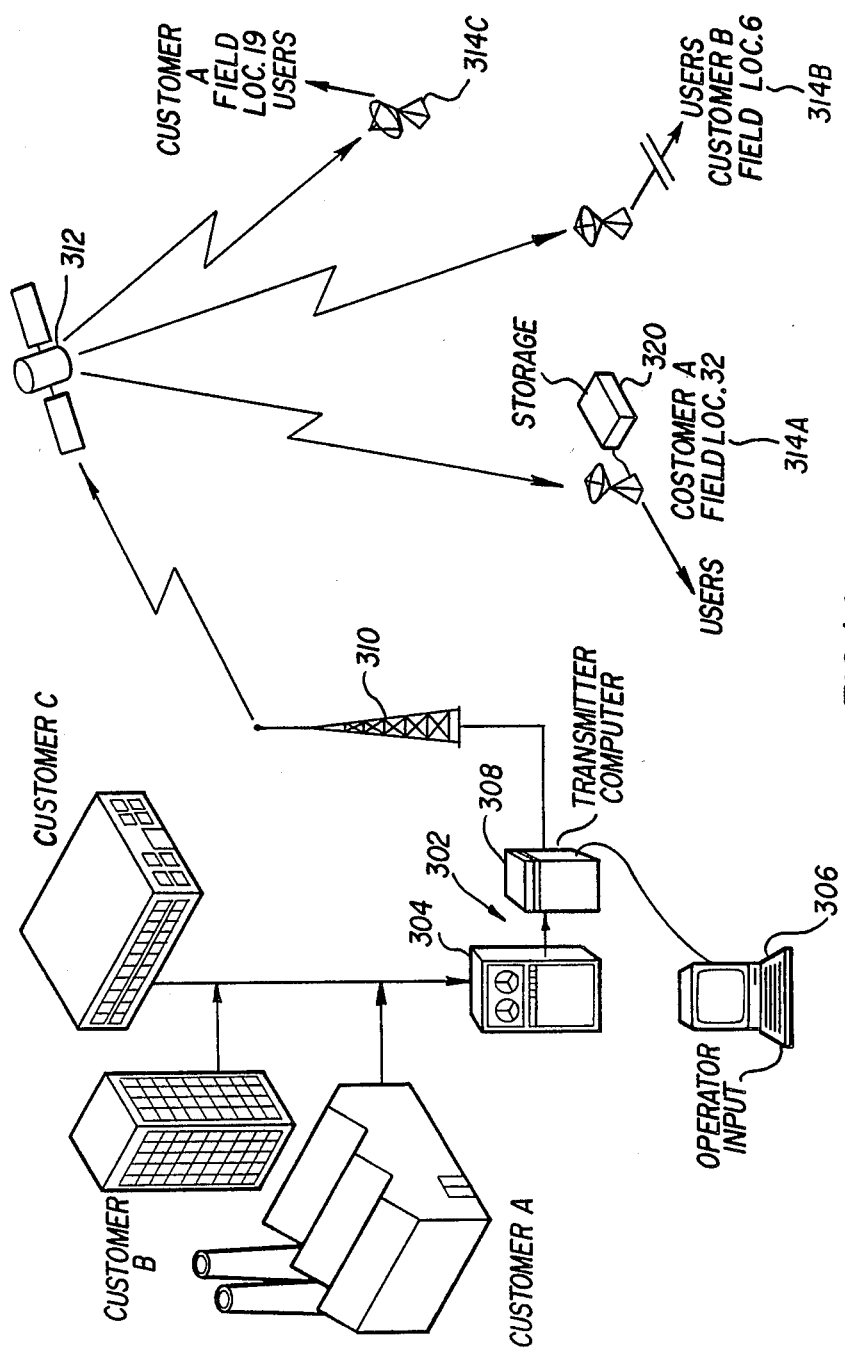
FIG. 1A shows an overall view of a communication system according to the invention configured for communication of information from a first customer location such as a home office or the like, to a second customer location such as a field location.

FIG. 1A shows the system of the invention as configured for example of transmission of messages from a commercial transmitter to commercial decoders. For example, FIG. 1A shows transmission of signals, which as noted may comprise audio, video, teletext or data, from Customers A, B, and C (300a, 300b and 300c respectively) to end users shown at 314a, b, and c as Customer A—Field Location 32, Customer B—Field Location 6, and Customer A—Field Location 17. Obviously these are exemplary and are merely intended to indicate the nature of the system of the invention.

As indicated, data flows from each of the home offices of Customers A, B and C to a central location 302. Also within the scope of the invention are arrangements where several offices of a single customer all share the same transmission facility; alternatively, the central facility 302 can be the property of a firm which merchandises these communication services to the various corporate customers.

In either event, the signals received at the central location 302 are typically stored at 304 for later assembly and encoding into the so-called B-MAC composite transmission signal format employed according to the preferred embodiment of the invention. The storage means shown is a tape drive, but obviously other convenient forms of storage can be used. An operator provided with an operator input keyboard and CRT or the like as indicated at 306 controls a suitably programmed computer 308 to assign the various data to various transmission services to be transmitted at particular periods of time. The operator thus defines the groups of decoders which receive the various signals, assigns the groups to receive particular service packages at particular times, and defines the services of each package The computer 308 is also used to create a "database" of past system configurations, to allow rapid changes between reused system configurations.

More particularly, according to the present invention, the decoders are each assigned to one or more Groups. The operator operating in conjunction with the computer 308 can revise the assignment of each decoder to a group by sending each decoder a so called "addressed packet" (as described in detail below) indicating group membership. This is done as needed, perhaps on the order of once per month. Thereafter, to define the services to which a particular decoder has access, the operator need merely assign a particular service to a "service package," which is defined as a set of services, and assign each group or set of groups to receive a particular service package. As mentioned, historical records of the assignments of the decoder to the services, and so forth, are maintained so that earlier configurations can be readily recalled for subsequent reuse.

For example, suppose the Chairman of the Board of a particular corporation desires to address all the corporate field locations once per month. All decoders will therefore be assigned to a first group. Suppose the sales department wishes to send out a monthly "video memo". All the sales offices would thus be assigned to a second group. If the head of research desired to similarly communicate with all the research departments, they will be assigned to a third group. It will be appreciated that if all the remote offices belong to groups, there need be no separate group to which all the decoders belong. Instead the Chairman of the Board's monthly message can simply be sent to all of the groups. All of this is very readily accomplished by the operator operating the transmitter computer 308, as will be detailed below.

After the message from the various network users 300 A, B, and C are received at the central location 302, the signals are transmitted by way of an antenna 310 to a satellite or other transmission medium 312, which may include a landline. The satellite sends the signal along a downlink towards all the decoders 314a, 314b and 314c. It is then decoded and made available to the users as indicated. In the example shown in FIG. 1A, the arrow connecting the receiver 314b with the user is shown broken whereas those for the receiver 314a and c are shown connected to the users. This is because, as indicated by the legends, the receivers 314a and c belong to Customer A's field staff. When a message is sent by Customer A, clearly it is essential that only the decoders of its field offices be able to receive it. Therefore the staff at 314b, belonging as indicated to Customer B, field location 6, should not receive this message. The messages transmitted therefore include repeated indication of the group which is entitled to receive the information. In effect, each of the decoders receives all the information transmitted, but does not permit the users to "see" the signal unless the decoder itself recognizes the message as having been transmitted to a group of which it is a member.

As noted, the decoders may be attached to storage devices, as indicated at 320. In the preferred embodiments the control signal sent to the decoders may include a signal activating the storage device, which may simply be a conventional video cassette recorder, to record a subsequent transmission. In this way, for example, a video message can be sent at night, when transmission time is relatively inexpensive, and stored automatically for viewing when convenient the following day.

B. The Communications Format Employed

1. Overview

Figure 2:
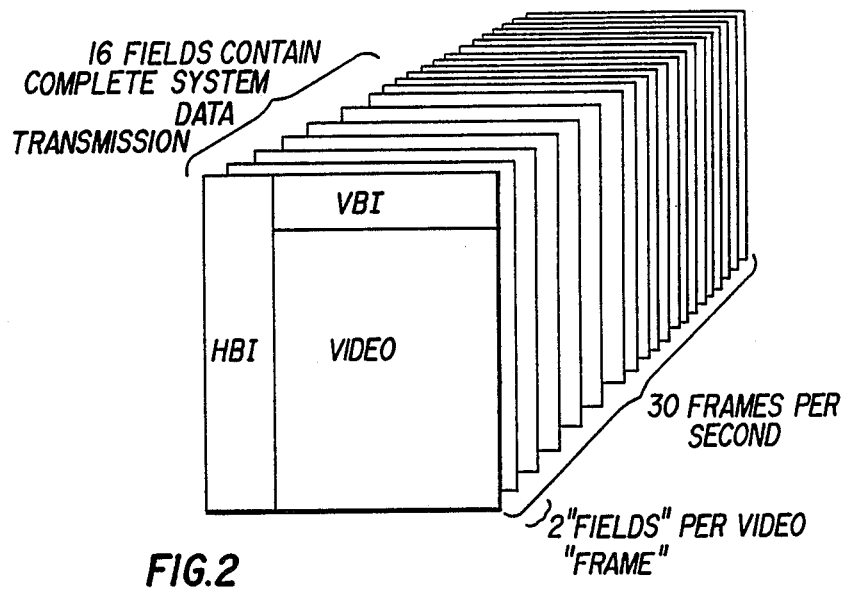
FIG. 2 shows an overall view of the signal format according to the invention, and explains certain nomenclature used for understanding the system of the invention.
Figure 20:
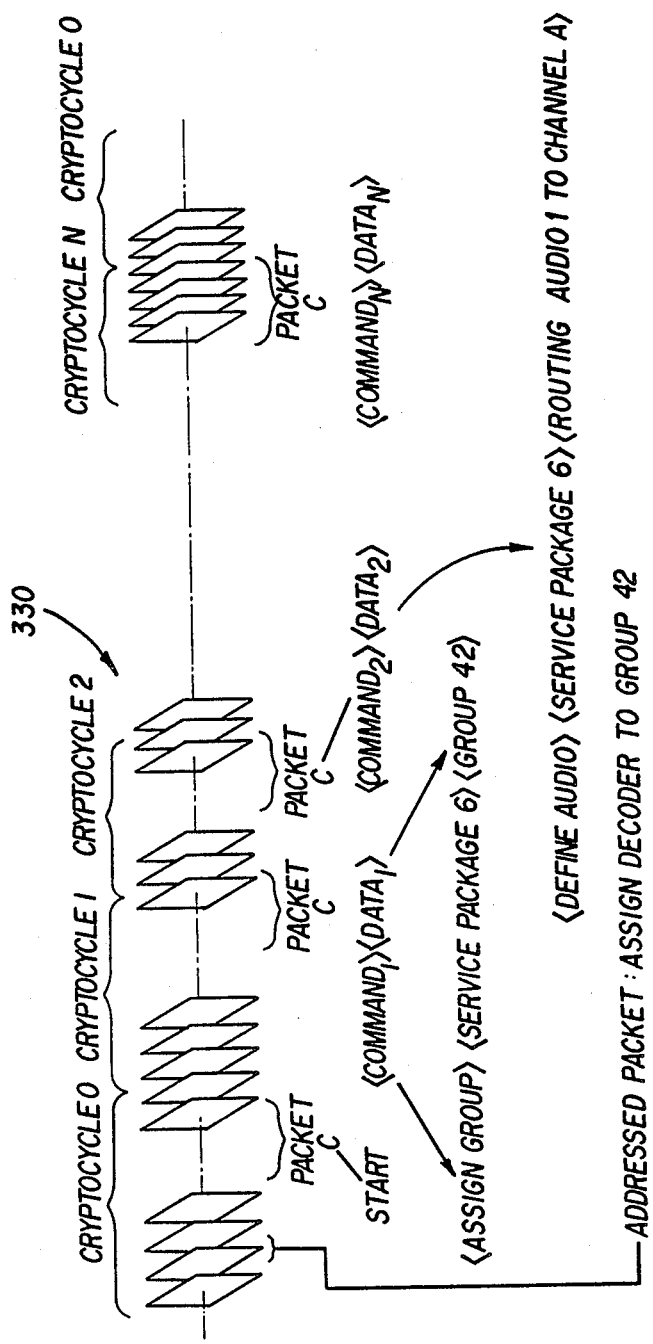
FIG. 20 shows in schematic form the transmission of the commercial command sequence for control of commercial decoders according to this aspect of the invention.

FIG. 2 shows the overall transmission format of the system according to the invention. (FIG. 20 shows another view of the overall signal format, including details relevant only in connection with the commercial decoder). As is conventional in television, a number of "frames", typically 30, each comprising a still image are transmitted per second as indicated. Each frame includes two "fields" as also shown. In a preferred embodiment of the invention, the video encoding scheme employed is that referred to generally generally as "B-MAC". This is an acronym for type B format, Multiplexed Analog Component system. "Type B" refers to the fact that data is carried integral to the video signal. See generally Lowry, "B-MAC: An Optimum Format for Satellite Television Transmission," *SMPTE Journal*, Nov. 1984, pp. 1034–1043, which discusses in detail the B-MAC format and explains why it was chosen over various competing systems.

According to the present invention, the vertical blanking interval (VBI) of each field contains certain "system data" necessary for operation of a subscription television system according to the invention, as well as addressed packets and teletext lines used to carry data needed for the operation of individual decoders, for transmission of messages to individual subscribers, and for "commercial" operations, that is, intercompany transmission of video, audio, teletext and data. In the preferred embodiment of the present invention, the vertical blanking intervals of 16 total fields are used for complete transmission of all system data required, which includes an encryption key which is changed every 16 fields, that is, on the order of three times per second. The 16 - field interval is termed a "cryptocycle". As also shown in FIG. 2, each line also includes a horizontal blanking interval (HBI). During the HBI are transmitted six channels of high quality digitally-encoded audio information, with error correction, such that the decoder can also be used to supply a high quality audio signal. This can be used to provide the audio component of the corresponding video signal (or several versions thereof, in different languages) or an additional audio signal, such that subscription audio is also made available according to the system of the invention.

In the commercial decoder embodiment of the invention, a portion of the commercial command sequence, that is, control data used to define the services available to each particular group, is transmitted during each cryptocycle This is detailed below in connection with FIG. 12 and FIG. 20.

2. The Horizontal Blanking Interval

Figure 3:
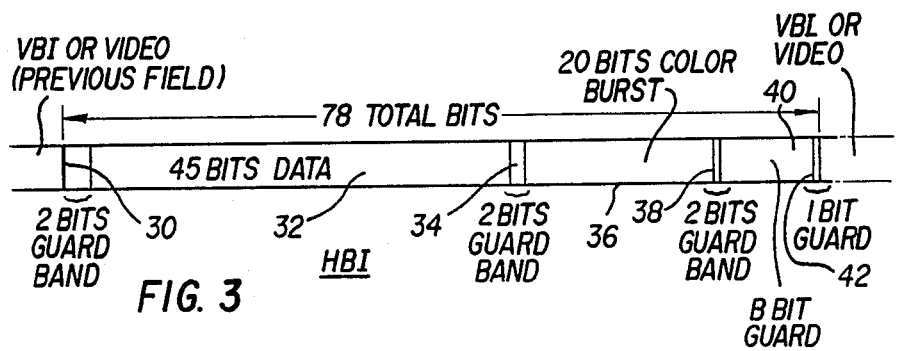
FIG. 3 shows in broad outline the format of the horizontal blanking interval.

FIG. 3 shows the format of the horizontal blanking interval (HBI), which begins each line of each field. In the preferred embodiment, the HBI consists of 78 total bits of four-level frequency-shift-keyed (FSK) data. The HBI is interposed between the vertical blanking interval or video information from a previous line and that of the present line. A typical horizontal blanking interval as shown begins with a two-bit guard band 30, followed by 45 bits of audio and utility data 32, a second two-bit guard band 34, twenty bits of color burst information 36, a further guard band 38, six more bits of data 40 and a final guard band 42, after which the VBI or the video signal of the particular line commences. The position of the color burst 36 within the HBI varies, to provide signal scrambling; descrambling involves the use of a repetitively-transmitted key, described below in connection with FIGS. 10–12. The number of bits of data in the HBI of each line can be varied pseudorandomly as well; the average number is 51.

Figure 4:
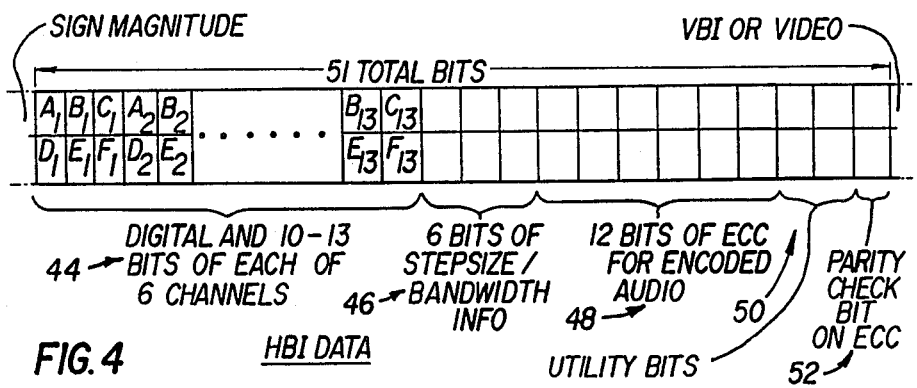
FIG. 4 shows additional details of the format of the horizontal blanking interval.

FIG. 4 shows some additional details of the horizontal blanking interval data 32 and 40 shown in FIG. 3. In the example shown, fifty-one total bits of data are provided in each line of the HBI, and each bit is four-level FSK encoded, such that each bit period includes transmission of two bits. One bit can be referred to as sign and the other as magnitude as indicated on FIG. 4. As shown, the first seventy-eight bits are digital audio; thus each frame provides a thirteen-bit digital representation of a sample of each of six audio channels High quality transmission of audio frequencies up to approximately 15 kHz is thus provided. Following the audio information are six bits of stepsize and bandwidth information. The stepsize bits indicate the size of the steps numbered by the thirteen bits of information preceding, and the bandwidth information relates to the amount of emphasis or de-emphasis of the signal employed. Alternate fields carry the stepsize and bandwidth data. Both these terms are used as conventional in the "Dolby delta modulation" scheme, which is employed in the preferred embodiment of this invention for transmission of the audio. Following are twelve bits of error correction code (ECC) for correction of the audio, indicated at 48. Four utility data bits follow at 50, and the last bits 52 of the data are parity check bits for checking the parity of the error correction bits 48.

The utility data bits 50 can be used for transmission of data encoded according to the well known RS-232c format, which is particularly useful in connection with the commercial decoder embodiment of the invention. Similarly, the audio channels can be reconfigured to carry RS-232c utility data as well. Other common encoding formats are of course within the scope of the invention.

3. The Vertical Blanking Interval

Figure 5:
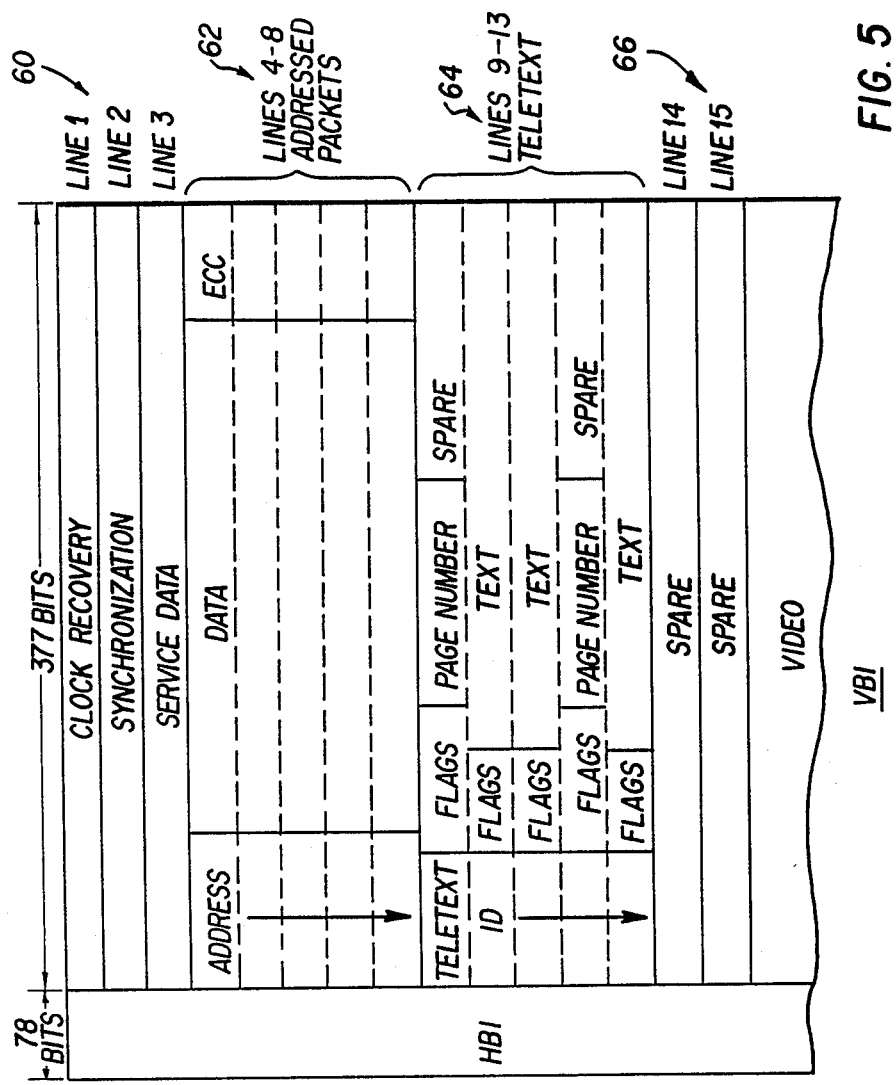
FIG. 5 shows an overview of the material carried in the 16 lines of the vertical blanking interval in a 525 line embodiment of the invention.

FIG. 5 shows the arrangement of the lines which make up the vertical blanking interval (VBI). The VBI includes 16 lines in the 525-line NTSC version of this invention. A slightly different number of lines are used in the 625-line PAL embodiment of this invention. The functions of the lines and their arrangement in other respects are identical. Discussion of a specific number of lines herein therefore should not be taken to limit the invention, except as specifically required.

As indicated, the vertical blanking interval is 377 bits wide. These bits are two level FSK encoded as compared to the four level FSK scheme used in the HBI as discussed above. Lines 1, 2 and 3 include the transmission of clock recovery, synchronization and system service data, as indicated in FIG. 5. The detailed formats of lines 1 and 2 and the use of the information contained therein are discussed in copending application Ser. No. 704,024, filed Feb. 21, 1985, incorporated by reference herein.

A particularly significant portion of the data contained in lines 1-3 is a system key which is updated every sixteen frames, that is, which changes with each complete system data transmission as indicated above in connection with FIG. 2. The system key is common to all decoders. The system key is contained in the service data of line 3, and is used for decryption of video program material audio and teletext text together with additional less frequently transmitted cipher data, as well as with invariant individual decryption ciphers. This arrangement provides substantial system security. Operation of this system is described in detail below.

Lines 4–8 of the VBI include the addressed packets, as indicated by reference numeral 62. As noted, these each contain an address which is then followed by data, concluding with error correction coding (ECC). The addresses are those of the individual decoders. The addresses in the address packets are transmitted in clear text, such that they can be received without decryption by the receiver. The remainder of the message is encrypted. In this way, addressed packet data, which is very significant to the proper functioning of the system because one of the addressed packets includes one of the decrypting ciphers needed, is provided with a high degree of security. Addressed packets addressed to differing decoders can be transmitted in the same field. In the commercial decoder embodiment of the invention, the addressed packet data is used to assign individual decoders to groups of decoders. In this way, group assignments can be varied "on the air".

As indicated at 64, lines 9–13 of the VBI are used to transmit teletext. The first part of each teletext line is a teletext identification which indicates that the line in fact is teletext. As shown, two types of teletext lines are used. Teletext headers include a relatively larger number of flags, and indicate which of the following teletext lines are part of a particular "page" or message. The text lines themselves include a somewhat lesser number of flags and text data; typically forty ASCII-encoded bytes are sent per text line, and up to twenty lines can be displayed on the user's screen at once. Finally, lines 14 and 15 indicated at 66 are not used in the presently preferred embodiment of the invention.

4. Line 1

FIG. 6 shows line 1 of the VBI which consists of alternative zeroes and ones, or maxima and minima of the transmitted symbol set, if multi-level symbols are used. At the typical NTSC transmission frequency, these symbols occur at a rate of 7.16 mHz, twice the color subcarrier frequency. Line 1 therefore contains a 52.66 microsecond continuous wave of 3.58 mHz, the subcarrier frequency. Preferably, the receiver will typically contain a clock driven at the color subcarrier frequency. (When the term "receiver" is used herein, it will usually include not only the standard television receiver, but also the decoder and other terminal equipment necessary to convert the incoming television signal to a standard format. The clock therefore may be considered part of the decoder portion of the receiving system). Line 1 is thus used to drive the receiver's phase locked loop circuit into synchronism with the transmitter clock.

5. Line 2

Line 2 of the VBI is shown in FIG. 7, which consists of a timing signal used for framing recovery. This subject is discussed in more detail in application Ser. No. 736,305, filed May 21, 1985 which is incorporated herein by reference. Beginning at symbol 79, a series of first code patterns P is transmitted. The first code pattern P is the following set of eight binary digits 1 1 1 1 0 0 0 0. This first code pattern P is transmitted 41½ times for a total of 332 symbols. After the first code pattern P has been transmitted, a second code pattern which is the inverse of P, that is, 0 0 0 0 1 1 1 1, is transmitted twice, in phase with P. Since the P pattern is transmitted 41½ times, it ends 1 1 1 1; and since the Q pattern is transmitted in phase, it begins 1 1 1 1. Hence the phase reversal occurs in the middle of a set of eight ones in a row. Finally, a field identification FD is transmitted which can be used to identify which one of the 16 fields transmitted in a cryptocycle is being transmitted in the particular field.

6. Line 3 a. The Cryptocycle

Figure 8:
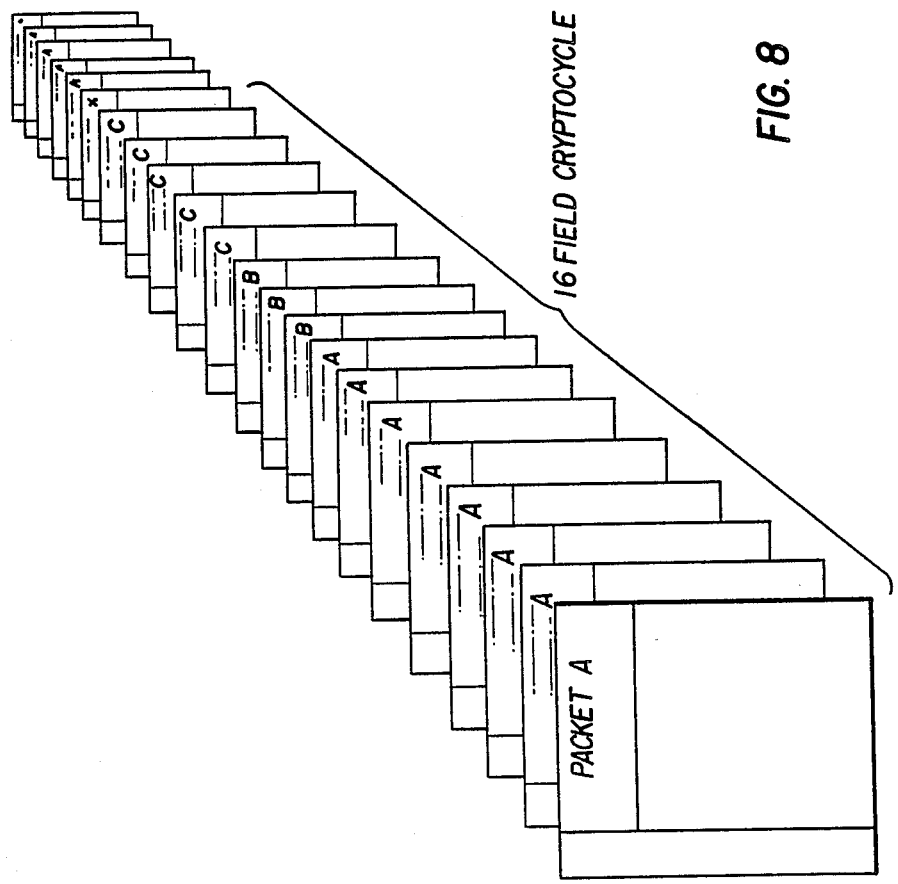
FIG. 8 shows in schematic form the sequence of transmission of the three packets of data making up the system data.

FIG. 8 shows the 16-field cryptocycle. According to this aspect of the invention, the system data transmitted in line 3 of the VBI is too extensive to fit into a single line, given the extensive data duplication and error correction coding provided, which is discussed in detail below. Therefore, the system data is divided into three packets which are transmitted as part of different fields. Furthermore, each of the three packets is repeated five times in successive fields, for further error elimination through the use of majority logic. Thus in FIG. 8, a first packet A is shown being transmitted in the first five fields of the 16 field cryptocycle, packet B is transmitted in the next five, and packet C in the succeeding five. The sixteenth field is marked with an "X" in the location of line 3; this is done to indicate that system data is not derived from the sixteenth field of the cryptocycle.

b. Line 3 Format

As mentioned above, three packets of data are transmitted in line 3. Each of these contains data which is relevant to the operation of the entire system. It is accordingly extremely important that each be accurately received. To ensure this, each packet is transmitted three times, as described above in connection with FIG. 8. Furthermore, each bit of each packet is repeated three times within the line and each individual bit is protected by a parity bit. Thus, in FIG. 9, one can observe that the first bit, bit $M_1$, is repeated three times and each repetition thereof is followed by a parity bit P. Bit $M_2$ is then transmitted identically and so on, until the last bit $M_{62}$ is reached. There are some additional bits which are transmitted, but which are not used; these are omitted from FIG. 9 for clarity.

As described in detail below, the decoder comprises a microprocessor and a microprocessor and teletext support (MATS) chip. The MATS chip provides a number of message processing steps which must be performed at high speed, higher than the capability of the microprocessor. As described below, the MATS chip and the microprocessor together reduce the 30 bits transmitted for each bit of the system control data to one. In particular, the MATS chip reduces the redundant data of each line to one, and the microprocessor performs 5:1 majority logic voting between the multiply-transmitted lines. This has important advantages as detailed below.

c. The Distinction between System-Wide and Individual-Decoder Data

It will be appreciated by those skilled in the art that the communications system of the invention requires certain data to be transmitted system-wide, that is, all the decoders must receive certain information, while other information should be transmitted only to individually addressable decoders. Furthermore, it will be appreciated that some data, such as data identifying the program material currently being transmitted or constantly changing ciphers, needs to be transmitted repetitively, over and over again, while other data need only be transmitted infrequently or upon a single occurrence.

According to one important aspect of the present invention, data which must be transmitted system-wide and/or repetitively is transmitted as part of the system data in line 3, whereas control data (as opposed to teletext) transmitted to individual decoders or groups of decoders is transmitted as part of the addressed packets appearing in lines 4–8. As mentioned above, three different versions of line 3, which together include all system data, are transmitted during the "cryptocycle" which is completed every sixteen frames, i.e., approximately every one-third second.

Other information repetitively transmitted as part of the system data, which is particularly significant in connection with the subscription television application of the system of the invention, includes the program tier number, that is, an indication of the tier to which the program being transmitted on a particular channel at that time belongs. The tier concept is used to separate various classes of programming transmitted by the transmitter. The user selects which tiers of programs he chooses to watch, e.g., sports programs, special features, premium movies, and the like. The user then indicates which tiers he wishes to view to the broadcaster, e.g., by telephone or by letter, and the broadcaster transmits indication of the tiers selected by the user to the user's decoder individually as part of an addressed packet. The individual decoders then use the tier number transmitted as part of the system data to either enable or disable the viewing of a particular program at a particular time. The distinction between system data and addressed packet data is thus illustrated: The program tier number relates to the particular program being transmitted by the broadcaster at a given time and thus clearly should be transmitted to all decoders. On the other hand, the primary and secondary program tiers, which terms refer to the tiers selected by and paid for by the subscriber, are transmitted individually as part of the addressed packets, thus enabling the decoder to determine which programs it should allow the viewer to see.

A similar distinction between data transmitted to individual decoders and data transmitted more or less system-wide is found in the commercial decoder embodiment of the invention. In this case, individual decoder group assignments may be altered by addressed packets addressed individually to the decoders. By comparison, the service packages made available to each group are defined group by group. That is, each group receives its service package assignments in a single portion of the system data transmitted in a given cryptocycle. Stated differently, the service assignment of a single group is transmitted during each of the cryptocycles. The services in a given service package are then similarly transmitted. The service package assignment is thereafter used by the individual decoders in determining which services the viewer is enabled to see.

d. The System Data Packets

Figure 12:
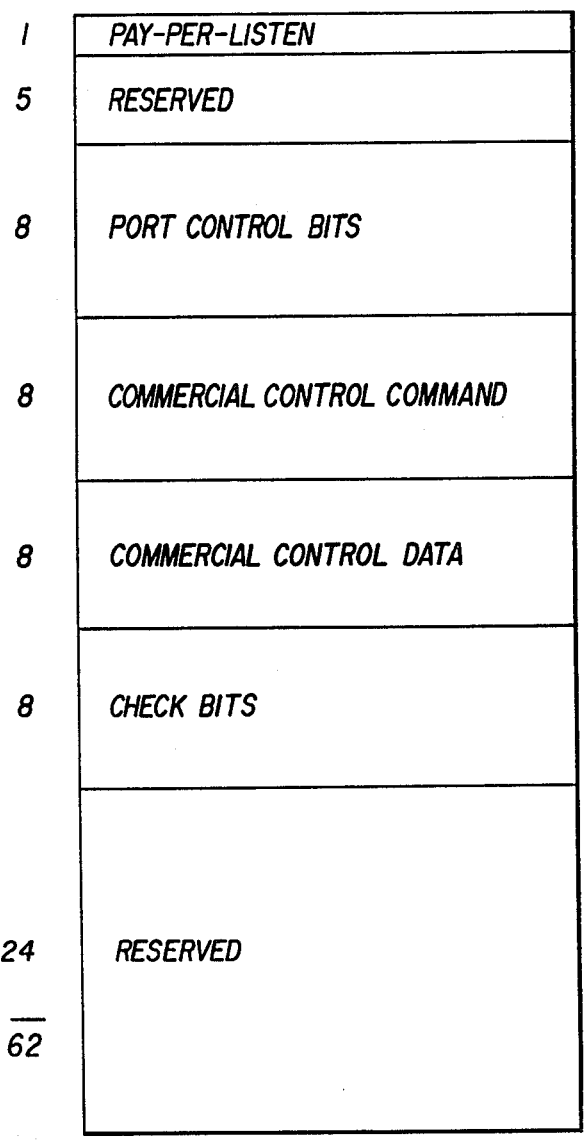
FIG. 12 shows in detail the data carried in the third packet, packet C, of the system data.

FIGS. 10, 11 and 12 show, respectively, packets A, B and C of the system data, that is, the three portions into which the system data is divided for transmission on line 3 of different fields. In each case, the Figure shows in a column extending down the left side the number of bits each data item requires, next to the title of the data item. A brief text description of each item follows. Most of the data items described relate to subscription television uses of the system of the invention. Where desirable for clarity, reference is made to the commercial decoder.

(i) Packet A

Thus, in FIG. 10, the first data item shown is a one-bit entry for "full field mode select." This bit is provided in order to allow teletext or addressed packets to be transmitted on what would otherwise be lines of the video signal. This capability is not provided in the presently preferred embodiment of the invention.

The next item is a two-bit entry for the key source code. These two bits enable broadcaster control of decryption of the signal, including the video signal, for a variety of purposes such as testing. For example, if this field is zero, that is, 00, decryption of the system data is done using a "fail" key which is stored as part of the microprocessor, and which is the same with respect to all the decoders in a given system. This allows all services to be decoded. The signal will of course have been encrypted using the corresponding key. In this way the usual steps required to transmit a key to the decoder for decryption can be bypassed for testing and similar purposes. When this field is 1, that is, 01, decryption is done using a second stored key referred to as the "test" key, in a similar manner and for similar reasons. When this field is 2, that is, 10, decryption of the system data is done using the even key of the month (KOM); when it is 3, hat is, 11, decryption is done using the odd key of the month. The key of the month is a decryption key which is transmitted to each individual decoder by way of the addressed packet, as more fully explained below. Because the key of the month is transmitted separately to each individual decoder, typically the key of the month for a succeeding month is transmitted prior to the end of the preceding month, so as to ensure that each decoder receives its key in plenty of time, so that the user is not prevented from seeing programs when the month ends and the encryption key used at the transmitter changes. The even or odd key of the month simply refers to which of the two stored keys of the month are to be used by the decoder in decrypting the signal.

The next item in packet A is a one-bit entry indicating an encrypted program. When this field is 0, the system data is nonencrypted; when it is 1, it is encrypted and therefore must be decrypted before use.

The following segment, "broadcaster identification" is a two-bit entry allowing one of up to four different broadcasters to be specified; this information is used in decoding the remainder of the system data. In particular, each of the four broadcasters may have two KOMs, differing tier identifications, and differing billing arrangements. The broadcaster identification bits allow all system data to be separately tracked for each. Throughout the following discussion this fact should be kept in mind, although usually only two KOMs are referred to, for example, for simplicity.

The next item, the program tier number, is an eight-bit entry. This in combination with the four-bit service tier number which follows specifies the class of program to which the currently transmitted program belongs. This information is used by the decoder for comparison to authorized program tiers, that is, program tiers selected and paid for by the user, to determine whether a particular user is permitted to view the particular program being transmitted, as discussed above.

The program number segment of the packet A is a 12-bit item which together with the segment identification forms a program identification. Should a user purchase a program through a pay-per-view arrangement, that is, as opposed to viewing it through its being a member of a tier to which he is authorized access, the program identification is saved in the memory of the microprocessor comprised by the decoder. This is used in order to track pay-per-view billing for the user's convenience.

The cost of current program item is an eight-bit field used to price the current program for pay-perview billing purposes.

The following item is the first section of the decryption key and is 14 bits long. This with the nine-bit second segment and the 32-bit third segment appearing in packet B (FIG. 11) together make up a 55-bit decryption key which is unique to each cryptocycle. That is to say, this portion of the decryption key information is varied at the end of each cryptocycle, that is, approximately every one-third second, which has the effect of rendering the unauthorized theft of any one of these decryption keys relatively worthless to the thief. The key may be used in decryption as generally discussed below and also to indicate the position of the color burst in the HBI, as discussed above. Different portions of the key may be used in decryption of different parts of the signal; that is, there may be separate audio seeds, video seeds, teletext seed; and so forth.

The remaining bit in packet A of FIG. 10 is a fast scrambling select bit which allows the selection between several descrambling algorithms to be used by video descrambling hardware comprised by the decoder See U.S. Pat. No. 4,642,688 to Lowry et al. which issued Feb. 10, 1987, incorporated by reference herein.

(ii) Packet B

FIG. 11 shows packet B of the system data. In addition to the last segment of the decryption key which was discussed above, this packet includes an eight-bit item entitled "black-out code." This is used for geographical black-out purposes, for example, to prevent reception of sporting events in the viewing area of the venue, which is frequently required in the business arrangements between the sanctioning body and the broadcaster. The decoder is supplied with an eight-bit number which is compared with the black-out code to prevent the viewer from viewing the program where indicated.

Following the black-out code is a single bit which is the most significant bit of the program cost which is used in conjunction with the cost of current program item appearing in packet A (FIG. 10).

Five check bits are also provided as indicated on FIG. 11. This field includes the last five bits of the system data, which are written thereto before encryption. This enables comparison of these five bits with the last five bits of the system data after decryption. This allows the decoder to detect bit errors in the system data and in turn to prevent operation using an improper KOM, by preventing the decoder from responding to system data. This is thus ultimately one point at which the KOM is used to ensure security of the program material.

A single bit is used as a fingerprint trigger. This bit when set causes the user identification number to be written to the user's screen at a particular point in the transmission of a particular program, such as a pay TV movie. If the user then makes an illegal copy of the program, using a VCR or the like, the user identification number will be written to the copy at a specific point known to the broadcaster. Should the user make illegal copies and distribute them, this will enable the broadcaster to locate the original source of the illegal copy and take appropriate action.

The next bit is an impulse enable bit which prevents the general public from buying the program through the buy button, but restricts purchases to the program tier method described above.

The following item includes five bits of audio/data channel usage information. This associates the six channels of audio with the program. For example, in many countries, several languages are spoken, or the same language is spoken in a number of different dialects, each of which may be separately transmitted by the broadcaster in association with the video portion of the program. In a preferred embodiment, $32(2^5)$ combinations of the following information categories can be provided in the six audio channels of the HBI: TV audio, monaural audio, pay audio, stereo audio, and data. The audio/data channel usage information thus provides the correlation needed by the decoder to satisfy the user's selection from among the HBI channels.

The three-bit program rating item provides an indication of the maturity level of the current program, for example, for use by parents in preventing access of children to inappropriate program material.

The next item, active video usage, allows indication of the program transmission format, i.e whether it is B-MAC, NTSC or otherwise.

The general message bit is used to indicate to the decoder that a general message, that is, a teletext message directed at all of the subscribers, for example, to indicate that a programming change has been made or the like, is available.

The source switch request item is a single bit used to automatically switch the decoder to a new transmitter, for use where plural transmitters are used to transmit the same program material, as may be useful, for example, in large countries where long distance transmissions may be difficult.

The next bit, scrambled program, indicates whether the video is scrambled or not, thus indicating to the decoder whether descrambling is necessary.

Finally, the tracked program item is a single bit which, if the program is purchased using a pay-perview arrangement, causes the program identification to be saved by the microprocessor.

(iii) Packet C

FIG. 12 shows Packet C of the system data. The first bit, Pay-per-Listen, indicates that a predetermined set of the audio channels are carrying subscription programs, that is, ones for which the user must pay if he wishes to hear the material. In such case, the program tier number, program number, cost of current program and track program fields pertain to the current program on the designated audio channels, rather than the current video program.

The next five bits are reserved, that is, are not used in the preferred embodiment of the invention.

The next four fields, each of which is eight bits long, provide additional system control bits The port control bits are not used according to the presently preferred embodiment of the invention. The commercial control command and commercial control data bits are used in connection with the commercial decoder embodiment of the invention as discussed in detail below. The check bits are used for error detection and correction of the data transmitted in the preceding two fields Finally, the last 24 bits of packet C are not used in the presently preferred embodiment of the invention.

7. Transmission of Subscriber Messages

As described above, a primary aspect of the communications system described and claimed in the present application is the transmission of individually addressable, encrypted messages from a transmitter to an individual decoder for display to the subscriber. (This function is not available in the presently preferred embodiment of the commercial decoder of the invention). As has been described previously, this is done by using an addressed packet to indicate to an individual decoder that a personal message for the subscriber is to be found in a forthcoming frame. The individual decoder is thus alerted to select that teletext message when it is subsequently transmitted. The addressed packets are also used to assign particular decoders to groups. The method of processing the addressed packet is essentially similar in both cases.

a. The Addressed Packets

Figure 13:
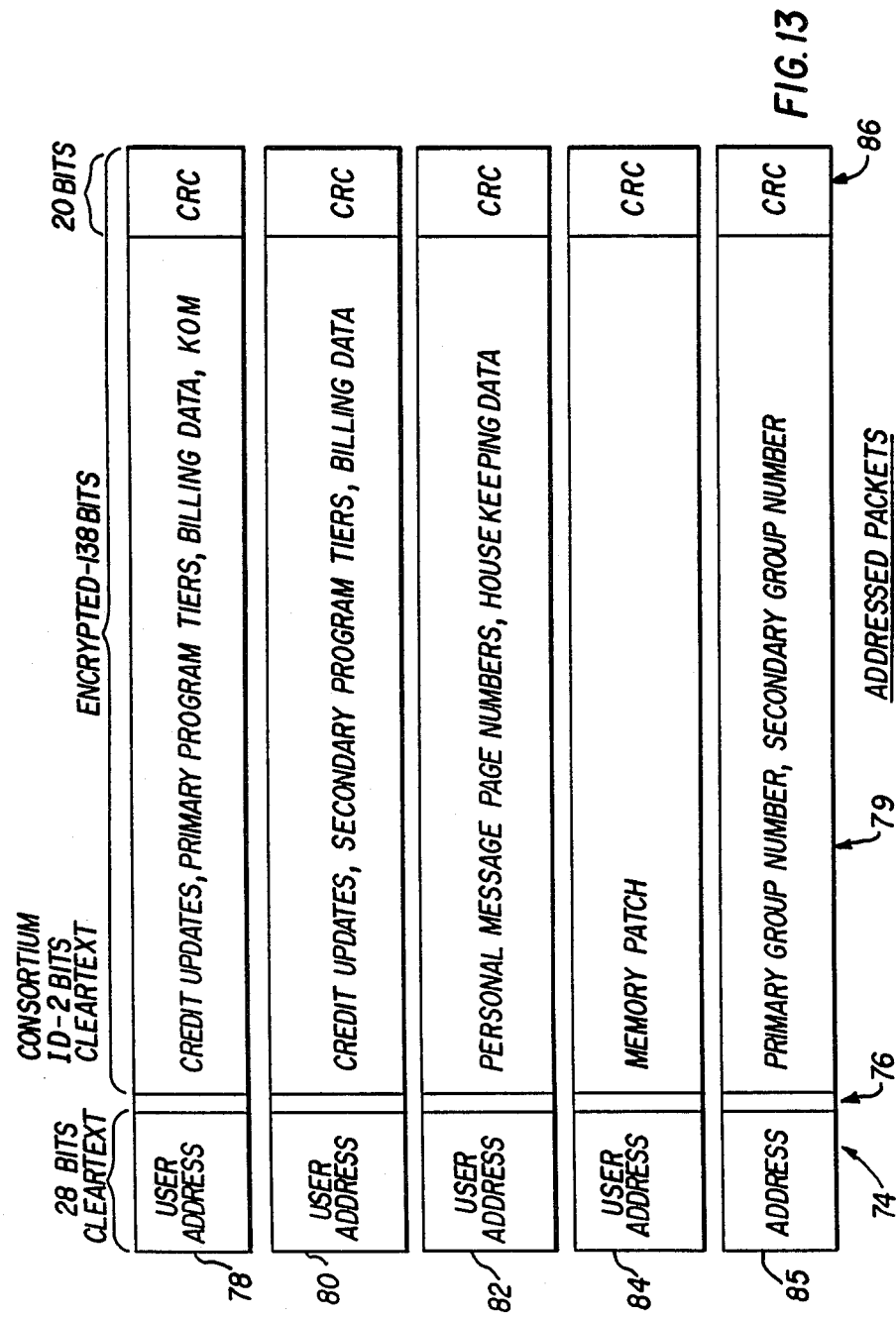
FIG. 13 shows the general arrangement and contents of four different types of addressed packets which can be transmitted in lines 4-8 of the vertical blanking interval.

FIG. 13 shows five types of addressed packets which are made available in a presently preferred embodiment of the invention. Their formats, and the various items of information shown on FIG. 13 as being transmitted by each can, of course, vary as needed, depending on the specific requirements of communication between the transmitter and individual decoders. Therefore, these particular addressed packets should not be considered exclusive or as a limitation on the proper scope of this invention.

The 377 bits of each of the addressed packets are encoded such that they can decoded by a one-half rate forward error correcting code. This reduces the number of useful bits to 188, which is the total appearing in each of the several possible addressed packets shown in FIG. 13. In each case, the first twenty-eight bits, indicated generally at 74, are the decoder address which is transmitted in clear text, that is, is not encrypted. This acts as a label for recognition by the target decoder. The twenty-eight bit user address allows a maximum of some 268,000,000 decoders to be addressed by an individual broadcaster. A nonencrypted two-bit consortium identification 76 is also provided in each of the addressed packets. This identifies a broadcaster or a group of broadcasters. The remainder of the addressed packet is encrypted, as indicated. This includes 138 bits of various keys, credit updates, program tiers indicating which programs which the decoder is authorized to access, and other information, and twenty bits of cyclic redundancy check data for error detection and correction of the 138 bits just described. Four of the encrypted bits, possibly in conjunction with the consortium identification bits, identify the addressed packet format of a particular line.

The data transmitted in the addressed packet can vary quite widely, as indicated generally in FIG. 13. For example, in a first addressed packet 78, the "message portion" 79 of the addressed packet may include credit update information, may identify the primary program tiers, that is, the classes of programming for which the subscriber has paid and therefore is entitled to view, other billing data, and importantly the key-of-the-month (KOM). As described above, and in copending Ser. No. 883,301, filed July 8, 1986 incorporated by reference herein, the KOM is used in the decryption of program data. The KOM is varied once per month, and is used together with a secret serial number which is permanently written into memory comprised by the decoder. The key-of-the-month is the same for all decoders, but is individually transmitted to each. This allows deauthorization of individual decoders as needed by the broadcaster. The key-of-the-month is used together with the secret serial number of each of the individual decoders, to provide a decryption key which is unique for each decoder. As will be appreciated by those skilled in the art, this provides a very high level of security to the system. It also requires that the key-of-the-month be reliably detected by the decoder.

In order to accomplish this goal, the primary addressed packet 78 is transmitted on a regular basis throughout the month, e.g., on the order of once every hour or so. In the preferred embodiment of the decoder of the invention, the "intelligent" portion of the system is always enabled, whether or not, for example, the subscriber is actually watching his television at the time, such that the key-of-the-month is reliably received, even if the subscriber rarely watches television. The key-of-the-month for a subsequent month can also be transmitted so as to be received in advance of the first day of the month so that no service interruption is likely to occur; as described above, a key-of-the-month odd-/even bit transmitted as part of the system data can be used to indicate which is to be used in decryption of any given signal portion.

A second addressed packet format is shown at 80. This addressed packet is transmitted regularly only if the consortium wishes to make use of more than the forty program tiers which can be separately identified within the primary addressed packet 78. If it is used, it may also include credit update information and other billing data as indicated, as well as the secondary program tier information shown.

Other addressed packets are shown at 82 and 84. These may contain a variety of data as indicated. For example, a third format shown at 82 may include personal message page numbers and system housekeeping data. The personal message page numbers are used by the decoder to select appropriate teletext lines from subsequently broadcast frames. The fourth addressed packet format shown at 84 is a memory patch address packet, which is used to modify the memory contents of a particular decoder, for example, in the event of a change of address or to correct certain fault conditions.

A fifth addressed packet is shown at 85. This addressed packet is used to change the assignments of commercial decoders to groups. As indicated it is of the same format as the other addressed packets and includes a primary group assignment, which is a binary encoded number between 0–255 ($2^8-1$). A secondary group number may also be provided, as shown. This can have two functions. One is simply to assign the same decoder to two groups using a single addressed packet. The other is to provide a 16-bit group number, to extend the number of groups possible to 65,536 ($2^{16}$)

b. Teletext Communication

There are a number of important objectives of the communications system of the invention which have a direct impact on the design of the teletext communication format employed. One of the most significant features is the fact that teletext messages to be displayed are to be selectable in several ways to provide flexibility to the system. For example, it was deemed highly desirable that the system be "menu-driven," that is, that the user be provided with screens showing help pages, diagnostic messages, programming schedules and the like, and that he be able to readily move through them at his own option. In order that the decoder can be economically manufactured, the large quantity of data required to provide the many screens showing these requirements cannot be stored at the decoder, as the amount of memory capacity required to store all this data would be prohibitively expensive. Therefore, as much of the data as possible is stored at the transmitter location. On the other hand, because it is highly undesirable that a continuous uplink or landline connection be provided between the decoder and the transmitter, i.e., to allow the decoder to cause the transmitter to send particular data needed, all this information has to be made available to the decoder on a regular basis, such that it can select the data it needs, for example, to construct the various personal messages or to implement the other desired features. Therefore, the teletext messages, at least insofar as they are identical for all subscribers, are transmitted repetitively, and the decoders are enabled to select those which they require, for example, in order to respond to the user's commands as input from a key pad.

The template feature of teletext is not especially important to the commercial decoder embodiment of the invention, inasmuch as this is not the primary requirement of the system as described above. Nevertheless, it does appear that in some circumstances, commercial decoders may desirably have the ability to select teletext templates and the like, e.g., for providing a format for a report for confirming the messages sent during a particular time period, so that where not specifically indicated otherwise this is to be deemed to be within the scope of the commercial decoder embodiment of the invention.

These diverse uses and objectives of teletext communication are achieved by the present invention, according to which teletext is transmitted in a bipartite format. Teletext according to the present invention is transmitted in the form of a number of text lines or rows, making up a page of text. The rows making up the page are preceded in transmission by a teletext header. The header indicates the fact that a teletext page follows and indicates its page number. A decoder looking for a particular page number, for example, a template page, scans the teletext page numbers provided in the teletext headers for the particular page of interest. When the page number sought is detected, the decoder then selects the following page, that is, selects for storage and eventual display all the teletext lines which follow until the next teletext header line is identified.

c. Line Formats

Figure 14:
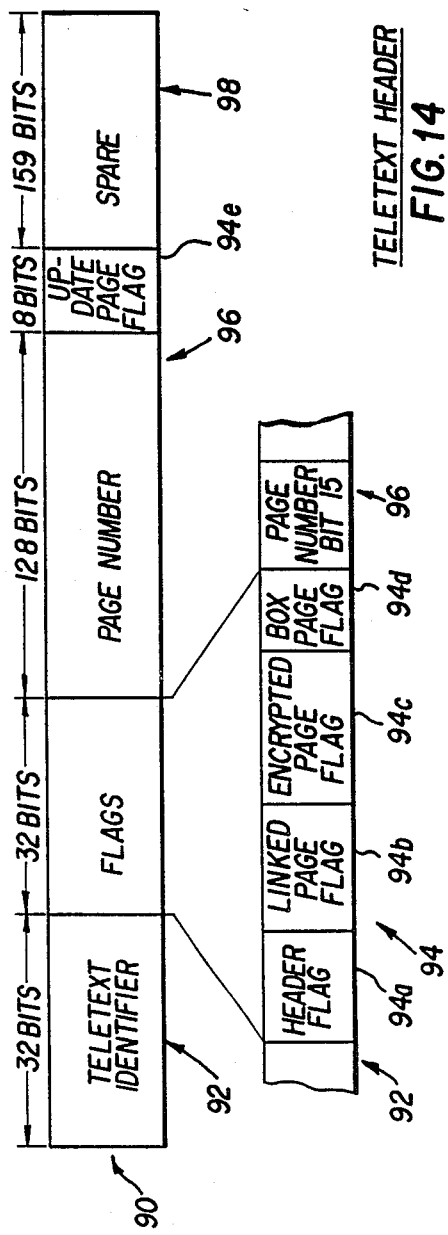
FIG. 14 shows the outline of a teletext header line which can be transmitted in any one of lines 9-13 of the vertical blanking interval.
Figure 15:
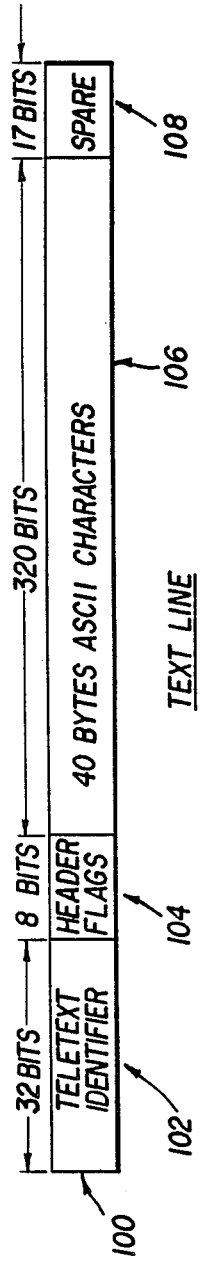
FIG. 15 shows a text line, that is a line of teletext, which may be transmitted during any one of lines 9-13 of the vertical blanking interval.

FIGS. 14 and 15 show respectively the formats of the teletext header and text lines. In FIG. 14, the teletext header 90 is shown as comprising a thirty-two bit teletext identifier 92. This field simply indicates that this particular line of the vertical blanking interval is a teletext line, as opposed to, for example, an addressed packet. The next thirty-two bit area 94 contains various control flags, which will be returned to momentarily for discussion. The teletext header then contains a 128 bit field which identifies the page number which is comprised by the following text lines, as indicated at 96. In the preferred embodiment, the page number is a sixteen bit number, each bit of which is encoded as an eight bit byte The flags 94 are similarly encoded; that is, a flag which is either a "1" or a "0" is nevertheless encoded as an eight bit byte for transmission, so as to render its correct detection more probable than if it were simply a single bit flag. For the same reason, the page number is a 128-bit word in which each eight-bit byte indicates whether the corresponding bit is a 1 or a 0, again for extremely reliable detection of page numbers. Finally, the last 165 bits 98 of the teletext header 90 are not used.

The flags 94 include a header flag 94a which indicates whether the teletext line is a header or is not, a linked page flag 94b indicating whether the subsequent page of teletext is one of a number of "linked" pages related to the present page, (that is, whether a subsequent page is textually related to the present page), an encrypted page flag 94c indicating whether the subsequent page is encrypted or not, and a box page flag 94d indicating whether the text shown in the subsequent page should be displayed against a video background or a black background. An additional update page flag 94e, indicating that the page is new, is not currently supported.

Additional details of the significance of the flags and their use is found in the co-pending applications referred to above.

As mentioned, each of the flags 94 is transmitted as an eight bit byte rather than as a single bit flag, to render the detection and decoding process more certain and thus to reduce overall system errors. As mentioned, the bits making up the page number, which identifies the succeeding page of text, are similarly encoded, such that a sixteen bit page number occupies 128 bits of the teletext header.

FIG. 15 shows the structure of an individual text line 100 up to twenty of which may make up a page of text. As in the case of the teletext header of FIG. 14, the first thirty-two bits 102 of the text line 100 are a teletext identifier. These are identical whether the teletext line is in fact a header or is a text line. The next eight bits are a header flag 104, which is identical to the header flag comprised by flags 94 of the header line 90, that is, it is an eight bit byte indicating that the teletext line is in fact a text line 100 and not a teletext header 90. The following 320 bits are devoted to the transmission of forty bytes of textual data. Typically, these are encoded according to the usual ASCII standards, whereby each byte is seven bits of data plus a parity bit for error detection. Thus, each text line transmits forty characters which may be any alpha-numeric character found in the ASCII character set. The last seventeen bits 108 are not used.

Thus, in practice, the broadcast transmitter transmits a sequence of teletext lines in lines 9-13 of the vertical blanking interval (see FIG. 5). Up to twenty text lines 100 may follow each teletext header 90. The teletext header 90 contains a page number 96 which identifies the following text lines as, for example, belonging to a template useful in displaying billing status, or as being the current information concerning the current movie being run, that is, describing its title, its lead characters, its length, and the price the subscriber will be charged for viewing it, or the like. It will be appreciated, therefore, that the teletext lines in any given vertical blanking interval may be all text lines 100, since only five teletext lines can be transmitted in a vertical blanking interval. (It will be appreciated by those skilled in the art that this numerical limitation (as well as others herein) relates to a 525-line NTSC-type signal; the actual numbers of the lines in the VBI are different in the PAL type 625-line system.)

C. The Commercial Decoder

As mentioned above, the composite communication signal format of the invention is designed to provide unprecedented flexibility in communication between a broadcaster and a decoder. Primarily, this involves communication of text messages to the subscriber. Nevertheless, it is also desired to utilize the same communication format for commercial applications, such as intra-company video communication, which do not require this capability. Instead what is required is the capability to provide certain signals only to certain decoders, e.g. those at a company's various locations. In this way, for example, an instructional tape can be simultaneously and automatically distributed to a number of locations.

1. Overview

The commercial decoder is designed specifically to fulfill the requirements of a private satellite communications network. An important distinguishing feature is the method of control, termed Group Control. The broadcaster controls the services which the commercial decoders deliver by Group Control data sent in the Vertical Blanking Interval—there is no means of control available at the decoder (the ON/OFF switch excepted). Only commercial decoders respond to Group Control commands.

Each individual decoder is assigned to a Group by an Addressed Packet. The network is controlled by signalling to Groups of decoders using System Data Packets - Type C. These packets indicate which Groups are authorized to receive the various parts of the B-MAC signal Several different packets are sent in a sequence in order to define this authorization Each packet is repeated five times (line 3, fields 9-14: the System Data C interval, as above), to allow for 5:1 majority logic to be applied at the decoder. A new packet is then sent during the System Data C interval of the following session. The complete sequence is known as a Command Sequence.

The Command Sequence defines all "Service Packages" which are active at the particular time. The set of all active services is termed a "Bundle". The Service Packages are defined by the Command Sequence in that it assigns authorization to decode parts of the composite B-MAC signal to a Service Package Number. Up to eight Service Packages may be defined at any one time. The Command Sequence also signals which Groups are assigned to each Service Package. Up to sixteen individual Groups may be assigned to a Service Package, or (by a single command) all Groups may be assigned to a Service Package. A complementary form of control is also possible i.e. "Assign All Groups Except . . . ".

A Command Sequence is of variable length, depending on the number of the control messages being sent. The limits of the Command Sequence are defined by the "START" packet. This signals the beginning of a new Command Sequence, and implicitly closes the previous sequence. The authorization(s) defined in the Command Sequence are not implemented by the decoders until the "START" packet of the following sequence is sent.

The advantage of this method of control is that large numbers of decoders can be grouped together and authorized/de-authorized simultaneously, allowing the network rapidly to be reconfigured. To increase flexibility still further, two Group Numbers may be assigned to each decoder The decoder will gain access to service(s) if either of the Group Numbers is assigned to a Service Package. Group Numbers range from 1 to 255; this can be extended to allow definition of some 65,000 groups, as indicated above.

To better understand the functions of the 16 bits provided in packet C of the system data (FIG. 12) which are useful in connection with the commercial decoder, the following additional information is provided. Additional information is found below, in connection with the discussion of FIG. 20.

2. System Uses

As described above, commercial decoders are addressed in common by assigning them to groups. Each of the groups is then assigned certain services, i.e. audio, video, teletext, utility data and/or combinations thereof, which may be received at any given time. In order to provide flexibility to this system, it is essential that the groups be capable of being reconfigured, that is, that individual decoders can be added or subtracted from particular groups. However, this is relatively infrequent if the group assignments are sensibly planned. More commonly, the services made available to a particular group need to vary. For example, in the example described above, the Chairman of the Board of a company desires to send out a monthly message to each of his field offices. In some months, this may include teletext; other months it may include data. There is no particular reason to have available a service which is not needed at any particular time. Therefore, in a first month, the operator does not assign the teletext service to the service package assigned to the particular group numbers which corresponds to the decoders of all the field offices. In the succeeding month, he adds the data service and deletes teletext, and so on.

For the above reasons, it is deemed desirable that the assignment of a particular decoder to a group be varied by way of the addressed packets, as discussed above and that the assignment of services to particular groups be varied by way of the system data. That is, decoder assignment to a group is performed using the individually addressed packet method of communication, while the service provided to the group is defined by the "commercial command sequence" which is transmitted in the system data.

As will be discussed in further detail below in connection with FIG. 20, the 16 bits of packet C of a particular cryptocycle assigned to transmission of the commands for control of the commercial decoders are insufficient to define all of the services assigned to all of the groups. In fact, each packet C of the system data is devoted to transmitting a single command directed to a single group. Still more particularly, the command sent by the packet C data may first send particular commands to particular groups and then define the action to be taken by the corresponding decoders in response thereto. That is, in a particular packet C, a particular group may be assigned a particular service package. In a subsequent packet, that same service package may then be defined as including teletext. Therefore, it will be appreciated that the transmission of a change in group service involves a multi-cryptocycle process.

3. Definitions

To more further fully understand the above, the following definitions are deemed useful Group Number - The commercial decoder stores in its secure memory a set of group numbers which are used in the interpretation of the "commercial control commands" (defined below) by the decoder. Each group number may have a value ranging from one through 255.

A Group - is the set of all decoders sharing a group number. The Group Number identifies the Group.

A Service - is defined as any authorizable portion of the B-MAC signal, i.e., audio, video, teletext, data or any combination thereof A Service Package - is defined as a set of services. Multiple groups may be assigned the same service package.

Commercial Control Command - refers to the commercial control command field of system data C in particular, and to the conjunction of the commercial control command and the commercial control data fields in general.

Commercial Control Sequence - A commercial control sequence is defined as the complete sequence of commercial control commands needed to fully configure the commercial decoders.

As described above, each packet C of the system data sent to the commercial decoders may include a command sent to an identified group of decoders. For example, a commercial control command may involve the assignment of a specific service package to a group. The syntax of these commands is such that the "assign group" command is a predetermined set of bits followed by a plurality of bits defining a number N which is the service package number. The bits of the subsequent field of packet C, termed "commercial control data", specify the group which is to be assigned service package N. Other examples of commercial control commands and the associated commercial control data are given below.

Finally, the check bits indicated in packet C of the system data are simply error detection and correction bits, for corroboration of the commercial control command and commercial control data bits.

D. Teletext Message Processing

1. Message Origination

Figure 16:
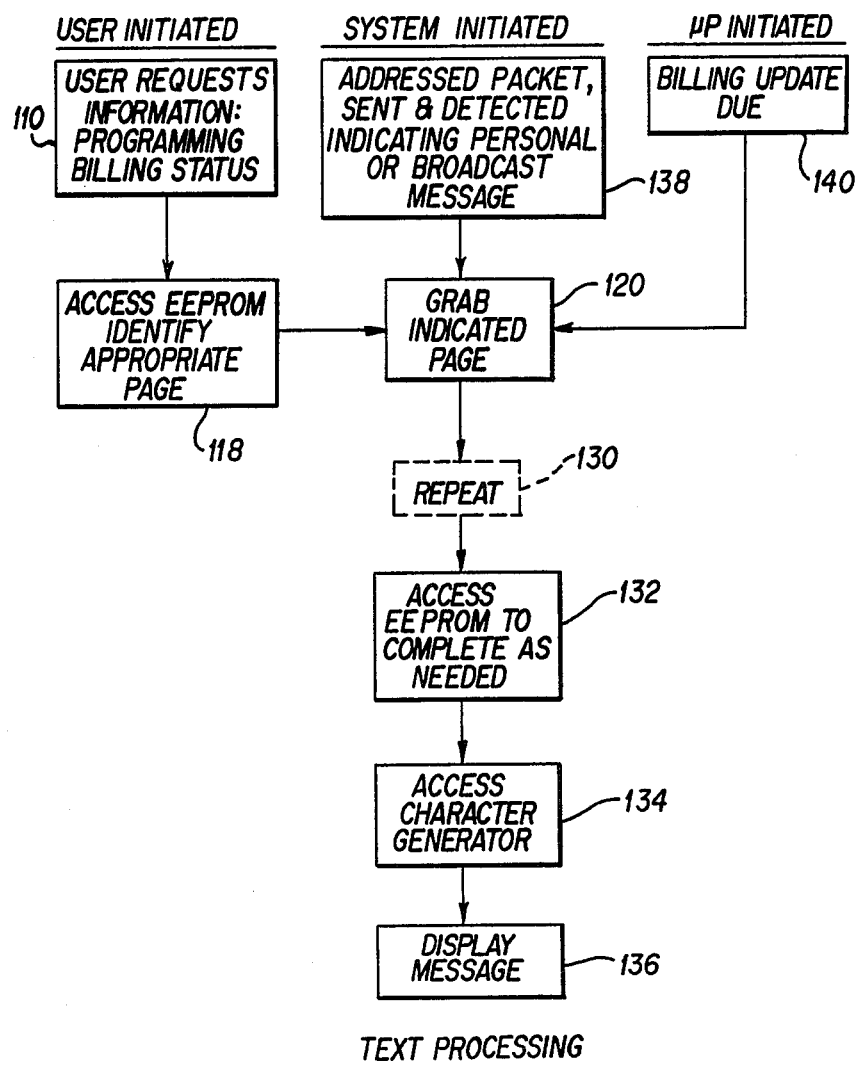
FIG. 16 shows in flow chart form the steps taken which result in display of a teletext message on a subscriber's television screen.
Figure 17:
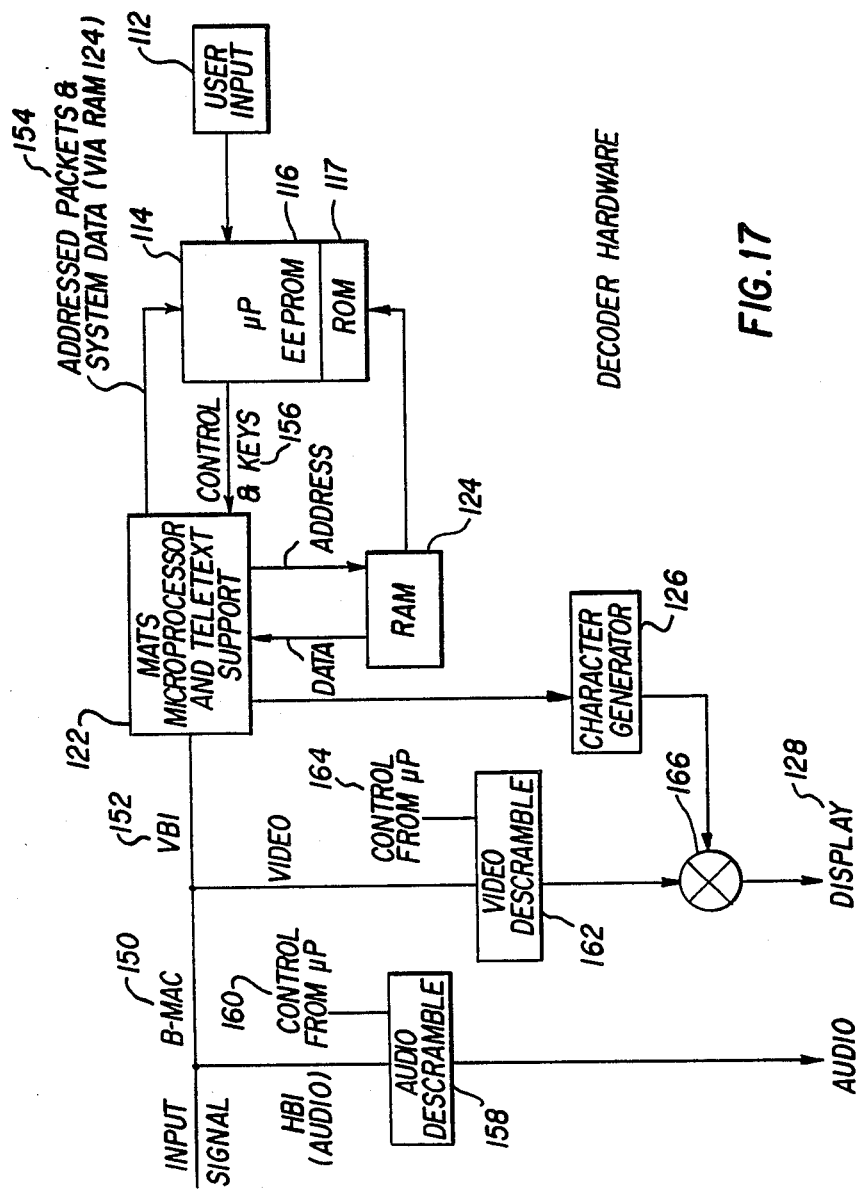
FIG. 17 shows the hardware of the decoder used for display of teletext information.

FIG. 16 indicates in flowchart form the steps taken which result in the display of a teletext message on a subscriber's television screen in the system according to the invention. FIG. 17 shows in schematic form the hardware of the decoder which is used to perform this function, as well as the ordinary video processing. The following discussion of teletext processing may benefit from simultaneous consideration of both figures.

As mentioned above, in a preferred embodiment of the invention, a teletext message can be generated in response to a user-initiated request, in response to the decoder determining that a particular message should be given to the subscriber, or in response to the broadcaster's transmitting a message to the individual subscribers. FIG. 16 shows how these three forms of initiation of a message all result in a display thereof. The user-initiated service path begins on the left side of FIG. 16 at 110. For example, suppose the user wishes to see on his screen the current program material being transmitted, or wishes to check his billing status. He presses the appropriate key or combination of keys of a key pad, as indicated at 112 of FIG. 17. The decoder comprises a microprocessor indicated at 114, which accesses an electrically erasable programmable read-only memory (EEPROM) indicated at 116 to determine which teletext page number provides the appropriate template for this information, as indicated at 118. In the preferred embodiment, the microprocessor 114 is a "secure" microprocessor, meaning that it cannot be tampered with or its software read out or altered without destroying it, and the EEPROM 116 is comprised therein. As indicated at 120, the decoder then "grabs" the indicated page when the teletext header including the appropriate page number is received by "grabbing" the teletext lines which follow the teletext header thus identified.

As shown in FIG. 17, the microprocessor 114 is assisted in its operations by a chip referred to as MATS 122, these letters being an acronym for Microprocessor and Teletext Support. In the preferred embodiment of the invention, MATS 122 receives the page number from the microprocessor 114 and compares all incoming teletext page numbers with this number. When MATS 122 detects a coincidence, it then copies all succeeding text lines until a further teletext header is detected, and stores these text lines in a random access memory (RAM) 124. It subsequently causes these to be read out and passes them to a character generator 126, which integrates them with the video signal and displays these on the subscriber's television as indicated at 128.

As indicated at 130 on FIG. 16, in a preferred embodiment, the step of grabbing independent pages is repeated. This is to ensure that the teletext page lines are correctly received.

Should the page grabbed at 120 have been a template page, subscriber-specific information is needed to complete the information. This information may be stored in the electrically erasable programmable read only memory 116 (FIG. 17) and are used to complete the template page as needed, as indicated at 132. The complete ASCII encoded stream of bits is then supplied to a character generator 126, as indicated generally at 134, which in turn is used at 136 to supply a complete video signal to the display unit 128.

FIG. 16 also shows as mentioned the steps taken when the system initiates the display of a message on the user's television screen and when the decoder initiates such a step. At 138, the transmitter causes an addressed packet to be sent indicating that a personal message is available at a particular page number. For example, the addressed packet format shown at 82 of FIG. 13 would typically be sent. The MATS 122 in this case would recognize the decoder's identification number in the addressed packet and send it to the microprocessor. The microprocessor will then return the page number to the MATS 122 which can thereafter grab the indicated page as shown at 120 and process and display the message as above.

A third method of initiating a message is shown beginning at 140 of FIG. 16. In this case, the microprocessor initiates the message. For example, in the commercial decoder, this facility can be used to display error messages or other control information. In the individual subscriber decoder, for example, when the microprocessor detects that the subscriber's credit level is running relatively low, it should alert him that he should arrange for increased credit by sending the broadcaster a payment. Thereafter, of course, the broadcaster will transmit an addressed packet to the decoder, which is detected by the microprocessor and used to update the billing records. In this case, the microprocessor 114 selects from a ROM 117 the page number of an appropriate template for displaying to the user his billing status. The ROM 117 stores the microprogram which is run by the microprocessor, and which includes the page numbers. Responsive, for example, to a user input, the micropocessor 114 sends the appropriate page number to MATS 122. MATS 122 thereafter compares the page numbers of all incoming teletext pages until it detects this particular page. When it does so, it copies this template into RAM 124. It then completes the page by inserting the user's various billing information into the template and displays it at 136.

It will be appreciated that there has been described an extremely flexible method of providing individually addressable teletext messages to a subscriber in a subscription television system. Additional possibilities and features of the system are discussed in the co-pending applications referred to above.

To conclude the discussion of FIG. 17, the B-MAC signal is input at 150. The data contained in the vertical blanking interval (VBI) is shown at 152 being passed to MATS 122 for processing as discussed above. The MATS examines the user numbers of the addressed packets and supplies those bearing the correct number to the microprocessor. The addressed packet and system data are directed as shown at 154 to the microprocessor 114 for generation of control signals and decryption keys, transmitted at 156 to the MATS. Meanwhile, the remaining portions of the vertical blanking interval data, the teletext material, is processed by MATS 122. In general, the teletext data is stored in RAM 124 and is subsequently supplied to the character generator 126 after decryption using the encryption keys provided at 156 by the microprocessor 114. As mentioned above, if a particular text header indicates the presence of a linked page, a second page of text will be selected by MATS 122 and stored in RAM 124 for supply to the character generator 126 upon request thereof by user input at 112.

FIG. 17 also shows schematically the processing of the audio information contained in the horizontal blanking interval (HBI). This is sent to an audio descrambling unit 158 which receives a control signal from the microprocessor at 160 for controlling access to any pay-audio services which may be provided by a broadcaster. Somewhat similarly, the video signal is sent to a video descrambler 162, which is also supplied by the control signal from the microprocessor at 164, providing the descrambling information necessary and preventing access of the subscriber to programs to which he is not entitled, using the information contained in the addressed packets, all as discussed above. The video signal is combined in mixer 166 with the teletext video from character generator 126 and supplied to a display unit 128 as indicated.

As indicated at the caption 154 in FIG. 17, the addressed packets and system data, separated from the remainder of the vertical blanking interval data by MATS 122, are supplied to microprocessor 114 via RAM 124. This is because, in general, the microprocessor 114 is much slower than the MATS 122, so that the RAM 124 is useful as a data buffer.

In the embodiment of the system of the invention described above, each addressed packet is individually addressed and received. This places a limitation on the throughput of the system, that is, it limits the number of individual packets which can be sent. To alleviate this problem, a "bank adressing" scheme may be employed. In this embodiment, the decoders are divided into "banks" and are assigned to users having characteristics which make it likely that messages may be commonly addressed to them, for example, common time-zone residence, common language, etc. [This is of course to be distinguished from the manner in which plural commercial decoders are assigned membership in groups, which is discussed in detail below.] Each of the decoders in a bank responds to the same 28-bit user address, that is, each receives the same addressed packet. Further, each decoder in a bank has written to it at manufacture a six-bit member code. A bank- addressed packet includes a number of "packet enable" bits, each one of which is assigned to one of the decoders of the bank. Thus, when an addressed packet is received, the stored member code is used to determine whether the corresponding packet enable bit is set; if so, the other addressed packet functions described above are enabled. A single data bit can also be transmitted to each decoder similarly, as part of a second group of bits in an addressed packet corresponding to the packet enable bits; again, the member code is used to identify the corresponding one of the second group of bits. In this way, one-bit individual messages can be communicated to a number of individual decoders by transmission of a single addressed packet.

2. Partition of Decoder Functions

Figure 18:
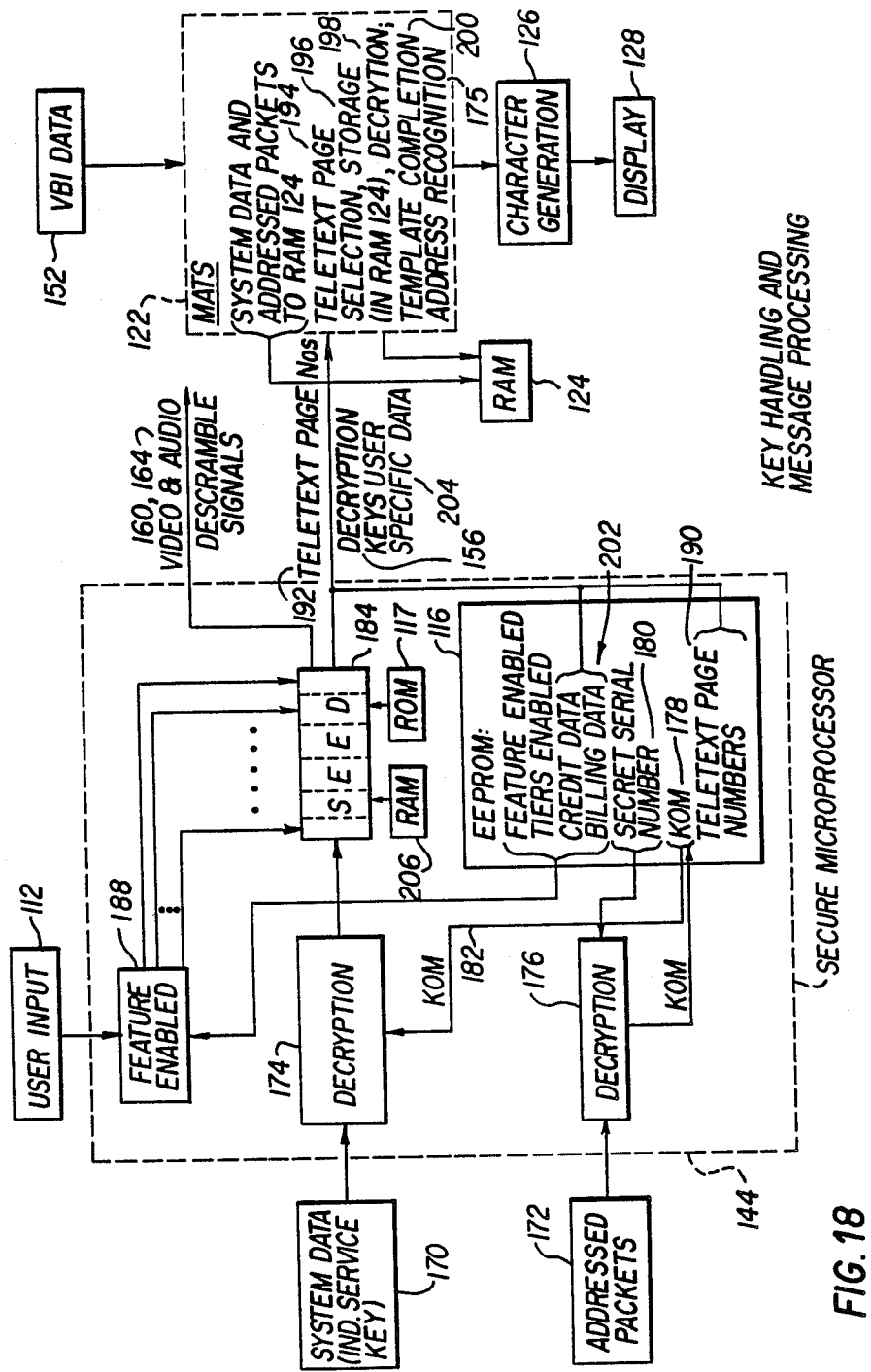
FIG. 18 details the relative arrangement of the microprocessor and teletext support chip (MATS), its connection and relationship to the microprocessor, and the functions performed by each.

FIG. 18 shows the key elements of the decoder shown in FIG. 17 in significantly greater detail, and indicates in block diagram form the functions performed thereby. As discussed generally above, vertical blanking interval data indicated at 152 is supplied to MATS 122. At this point, system data and addressed packets are stored in RAM 124 for later accessing by the microprocessor 114 as indicated at 170 and 172, respectively. The system data taken from RAM 124 at 170 includes the service key, which as discussed above changes with every 16-frame cryptocycle, that is, each time a complete set of system data has been transmitted, all as discussed above.

The addressed packet data supplied to RAM 124 by MATS 122 is supplied at 172 to microprocessor 114. As mentioned above, the user address portion of the addressed packet, which as noted above is transmitted in clear text, is compared by MATS 122 to a decoder identification number, stored therein at manufacture as indicated at 175. If the numbers match, such that the addressed packet is appropriate for processing by the particular decoder, the remainder of the addressed packet is supplied to microprocessor 114 as indicated at 172 and decrypted at 176 using a secret serial number which is stored in the electrically erasable programmable read only memory (EEPROM) 116 at manufacture of the device, as indicated at 180. Preferably, a bar coded label is attached to each microprocessor chip at manufacture. An assembly worker wands the bar coded chip so that this bar code identification is supplied to an associated computer device. Thereafter, the computer associates a secret serial number with that decoder number without requiring operator intervention. The computer then writes the secret serial number to the EEPROM 116 The correlation between the decoder identification and the secret serial number stored in EEPROM 116 is critical to the proper functioning of this system Therefore, this information is guarded very carefully.

The output of decryption unit 176, in addition to the other data contained in the addressed packets as discussed above, includes the key-of-the-month (KOM), which as mentioned is transmitted repetitively over a period of a month, and in advance of the month in which it is to be effective, all such that each decoder can obtain the key-of-the-month well in advance of its being required for decoding of program material. The odd and even KOMs are stored (for each broadcaster, as noted above) in the EEPROM as indicated at 178. The selected KOM is supplied as indicated at 182 to a further decryption unit 174 and is thereafter used to decode the system data. As mentioned, the system data is transmitted frequently and repetitively, on the order of every one-third second, to keep the system control data up to date.

The output of decryption unit 174 is supplied to a " seed" 184. The seed 184 is intended to refer generically to means for generating a number of control signals and decryption keys which are, in effect, the control outputs of the microprocessor. For example, the seed output includes video and audio descramble signals supplied at 160, 164, respectively, to audio and video descrambler 158 and 162, respectively, as discussed above in connection with FIG. 17. Similarly, the decryption keys are passed as indicated at 156 to MATS 122 for decryption of teletext data, such that personal messages can be decoded by the MATS from the encoded incoming VBI data 152.

The seed 184 also has as inputs to it a number of signals from a device identified generically as feature enabling unit 188. This unit receives an input from the user input key pad 112 and also a number of inputs from the EEPROM 116. These latter inputs include such things as the tiers enabled, that is, the classes of programs which the subscriber is permitted to watch. As discussed above, the system data 170 supplied to the microprocessor 114 includes program tier data indicative of whether a program being broadcast at any given moment belongs to a particular tier. Therefore, the seed combines the tier data from EEPROM 116, via the feature enabled unit 188 and the system data input at 170, to determine whether to permit video descrambling, as indicated by the video enable signal 160.

Teletext page numbers are also supplied to MATS 122 when, for example, the user desires to view the programming guide. In this case, the microprogram run by the microprocessor, which is stored in ROM 117 at manufacture, responds to the appropriate key pad input by sending the appropriate teletext page number to the MATS, as indicated at 192. Thereafter, as discussed generally above, the MATS 122 reviews the page numbers of all incoming teletext headers for the appropriate page number, and when it detects a match, grabs the subsequent text pages as indicated at 194. If the linked page flag indicates that the teletext message extends over more than one page, it selects plural teletext pages and stores those not immediately displayed, as indicated at 196, in RAM 124. If they are encrypted, as indicated by the encrypted page flag, it decrypts them, as indicated at 198, using the key supplied at 156. Finally, if the page is a template, it completes the template by inserting user specific information, as indicated at 200. The user specific information can include billing data stored in EEPROM 116, as indicated at 204; this may include credit data indicating the user's credit status, billing data including, for example, what programs he has recently purchased, should he desire to review his purchases, and the like, all generally as indicated at 204.

The secure microprocessor 114 may also include within it a relatively small RAM indicated at 206. This can be used to store data which is permitted to be volatile, that is, lost upon power-off to the unit, unlike the data which is stored in the EEPROM, which is retained even if power is lost to the unit. Data suitable for storage in RAM 206 includes such things as the user's selection of audio channels, and other user-selectable data.

Figure 19:
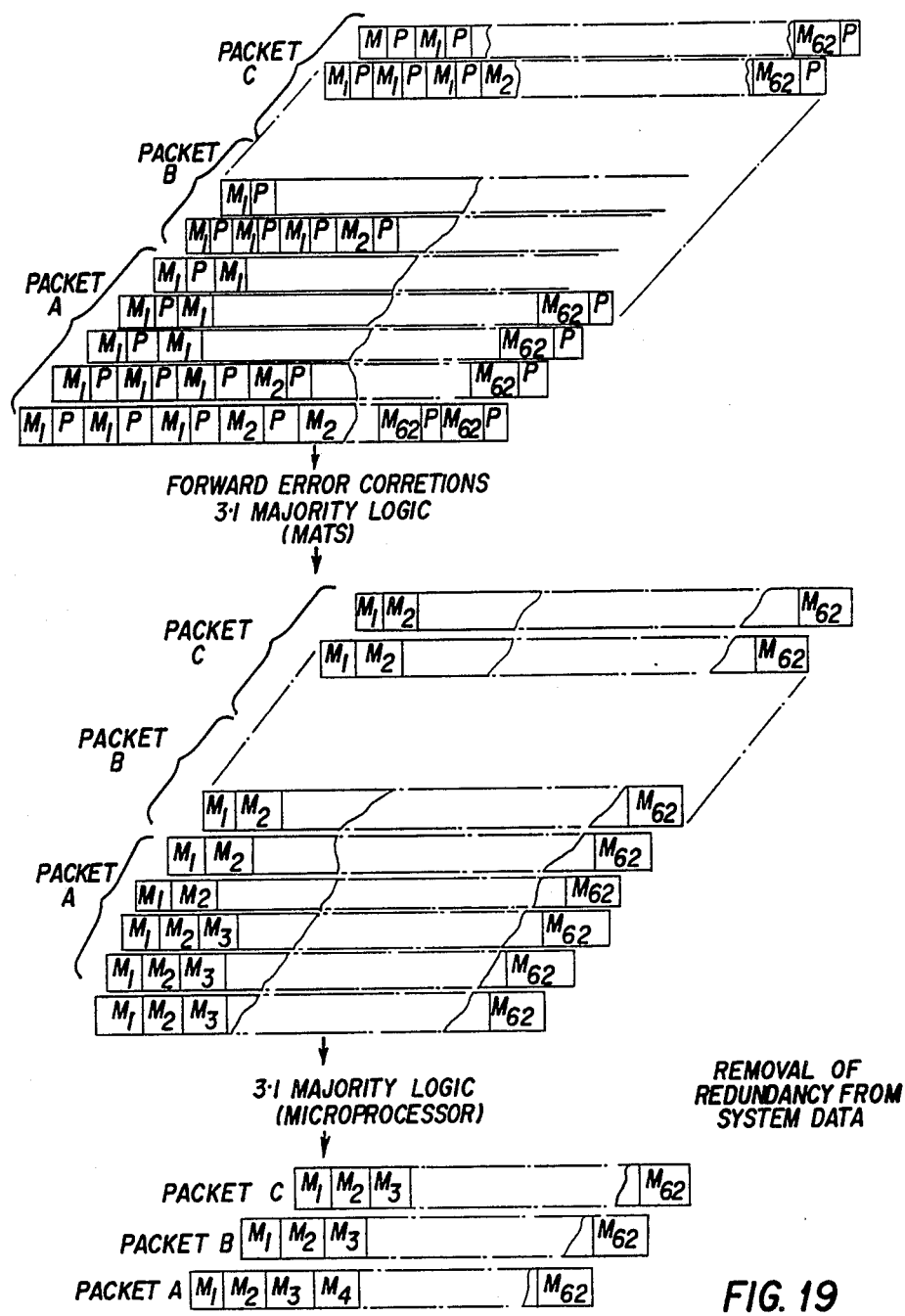
FIG. 19 shows the processing of the system data by the MATS and the format in which it is supplied to the microprocessor.

FIG. 19 shows schematically another example of the division of function between MATS and the microprocessor. As described above, the system data, which must be accurately received by all decoders in the system, is transmitted with a high degree of redundancy and together with error correction information, such as to improve the odds of its being received In particular, more system data is required than can be transmitted in a single line of the VBI, given the heavy duplication employed for reliability, and therefore the system data is transmitted in three packets, described in detail in FIGS. 10-12, one of which is transmitted during each VBI at line 3. Within each of these three lines, each bit of each of the packets is transmitted in triplicate and each of the three bits is provided with a parity bit, such that a total of 30 bits must be processed to yield a single bit of system data. (3 bits/line×5 repetitions of each line×2, for the parity bit). As shown in FIG. 19, the microprocessor and MATS each contribute to the reduction of the system data through a ratio of 30:1. MATS performs parity check and 3:1 reduction, while the microprocessor performs the final 5:1 majority logic voting. Note that the bit duplication is done both in a single field and over a number of fields. This is such that errors of different types are separately dealt with and eliminated. Gaussian noise will typically affect a single field so that the duplication of data across plural fields will enable its recovery. On the other hand, errors in the same part of the line of each field can be avoided due to duplication of the bit in each field. MATS performs the priority correction and 3:1 voting because these can be done in realtime at high speed; the microprocessor performs the 5:1 voting because this requires memory.

E. Use of System Data In Control of the Commercial Decoders

The co-pending applications referred to above include additional detailed disclosure of the use of the system data bits which is not particularly germane to the operations of the commercial decoder. Reference is made to the co-pending applications referred to above, which are incorporated herein by reference, for any additional details of the teletext signal processing and subscription television system operation which may be of interest to those of the skill in the art. Similarly, reference is made to the co-pending applications for discussion of the use of the credit, data and other billing information supplied to the individual subscription television decoders.

FIG. 20 shows in schematic form the manner in which the commercial control commands are transmitted. The endless sequence of fields shown schematically at 330 represents transmission of the B-MAC signal for a time sufficient to transmit the entire commercial command sequence. As mentioned a complete cryptocycle is defined by sixteen successive fields. Of these, the first five of the last six fields define packet C, all as described above. In the commercial decoder control sequence, each packet C contains a single command and a single data item used in response to the command. Thus, in cryptocycle 0 there is transmitted a "START" command indicating the beginning of a new commercial command sequence. In cryptocycle 1, there is transmitted a first command and a first data item. In this case, the command, for example, is "Assign group to service packet 6." The "data" is the number of the group which is to respond to this command, in this case group 42. In cryptocycle 2, the command and data together define the audio of service packet 6 to be channel A, i.e., service packet 6 includes the audio of channel A of the HBI. During the sequence all presently implemented commands are transmitted. Command N is the last command. Cyptocycle N is followed by the START command which then begins the entire sequence again; at this point any assignment changes made by the system operator in the interim are implemented.

It will have been noted that transmission of all the commercial control commands over a number of cryptocycles may take some appreciable time. This difficulty is addressed in an extension of the commercial control concept described below, which may be desirable in certain large systems.

The example given in FIG. 20 involves the assignment of a particular decoder to Group 42, assignation of Service Package 6 to Group 42, and subsequent definition of Service Package 6 such that Audio A (i.e. one of the six audio channels of the HBI) is to be sent to channel 2 of the decoder. This involves three commands, as follows:

The assignment of the decoder to the Group is done by an addressed packet identifying the decoder and the group;

The assignment of the service package to the group is done by a first decoder command; and The definition of the audio of the service package is done by a subsequent decoder command.

The following is a definition of a number of the commercial control commands which are currently supported in the currently preferred embodiment of the invention. The command titles are given, the syntax of the command and data fields are indicated, and a description is provided. In most cases, the command is followed by a data item, i.e. applying the commands to a particular group code or the equivalent. For example, the "Assign Group to Service Package N" command specifies that a change of the assignment of service package to a group is to be made, and is accordingly followed by a service package number and a group code, which identify the group and the service package to which it is to be assigned.

1. Description of Commercial Control Commands (a) Start Command Sequence (START hereinafter)

<Start Commercial Control Sequence>

This command marks the beginning of a new Commercial Command Sequence.

(b) Assign Group to Service Package N

<Assign Group><Service Package Number><Group Code>

This specifies that all decoders whose stored Group Number matches the Group Code (which is the following data item) are henceforth to obey every command (excluding Assign and Deassign) whose Service Package field is equal to N.

A special case of this command exists when Group Code is 0, in which case the command is directed to all recognized decoders.

(c) De-Assign Group from Service Package N

<De-Assign Group><Service Package Number><Group Code>

This specifies that all decoders whose stored Group Number matches the Group Code are henceforth no longer to obey the commands whose Service Package field is equal to N.

A special case of this command exists when Group Code is 0 in which case the command is directed to all recognized decoders.

(d) Define Audio for Service Package N

<Define Audio><Service Package Number><Routing>

This specifies that all decoders receiving the Service Package specified by Service Package N are to route an audio channel according to Routing Code (i.e., the succeeding data item) which specifies the source channel in the HBI Channel Code and the destination output in the Audio Output Code.

(e) General Control for Service Package N

<General Control><Service Package Number><Control Mask>

This specifies that all decoders receiving the Service Package specified by Service Package N are to implement the commands given in the sub-fields of the Control Code field.

Examples of the General Control commands available (several of which can be transmitted in a single command) are as follows:

Video Enable causes the B-MAC video to be descrambled and routed to the decoder outputs.

Utility Data Enable causes the Utility Data channel from the HBI to be decrypted and routed to its decoder outputs.

Teletext Output Mode allows use of separate video and text monitors. When set, this causes all requested teletext to be displayed on the Main Video output and the Separate Teletext output. Otherwise, the text is only displayed on the Separate Teletext output.

(f) Port Pin Control for Service Package N

<Port Pin Control> <Service Package Number>- <Enable Mask> <Control Mask>

This specifies that all decoders receiving the Service Package specified by Service Package N are to make use of the Port Pin Change Enable and Port Pin Output Bits sub-fields of the Port Mask field. The four-bit Port Pin Change Eable indicates which of the four Port Pins are to be changed, and the Port Pin Output Bits are the bits to be written. These are bits which are supplied directly to the microprocessor of the decoder for causing an output pin thereof to have a specific signal placed thereon. More particularly, this is useful in connection with remote recording of various transmissions. For example, an appropriate port control bit can be set to energize a VCR connected to the decoder for recording video information sent during the night, such that no operator need be present. Other uses of the port control bits will occur to those skilled in the art.

(g) Allow HBI Data for Service Package N

This specifies that all decoders receiving the Service Package specified by Service Package Number are to decrypt HBI (data only) channels specified by Mute Mask. When a bit in Mute Mask is set the corresponding HBI channel is muted, i.e. it is treated as data not audio.

(h) Extend Group Code

This command applies when decoders store two or more 8-bit Group Numbers. When this command is used, it must be immediately followed by either a Assign Group or a Deassign Group command. Group Code Extension is compared with Group Number 1 in the decoder. If they do not match, the following command (Assign/Deassign) is ignored. If they do match, the following command (Assign/Deassign) is interpreted in the nordal way with the exception that the Group Code of that command is compared only with Group Number 2 of the decoder. In effect, this command allows expansion of the maximum group number available from 256 (i.e., $2^8$) to 65,536 ($2^{16}$).

2. Command Syntax

The detailed syntax of the commercial control commands is <command> <data> where <command> is 8 bits per packet C and <data> is also 8 bits per packet C. The total number encoded by <command> is the sum of a 5-bit number which indicates the command being given and a 3-bit number indicating the number N of the service package. For example the <assigned group> <service vice package number> <group code> sequence described above specifies that all members of the group are to receive the service package specified by the service package number. Because the subfield <service page number> is 3 bits long, up to 8 ($2^3$) service packages can be specified. Finally, the 8 bits of the <data> field allows up to 256 ($2^8$) groups to be defined.

The following Table describes the command code syntax and the command data format in detail.

TABLE

| <Command Code> | Command Title | <Command Data> |
|---|---|---|
| 0 | Start Command Sequence | — |
| 8 + N | Assign Group to Service Package N | <Group Code> |
| 16 + N | De-Assign Group from Service Package N | <Group Code> |
| 24 + N | Define Audio for Service Package N | <Routing Code> |
| 32 + N | General Control for Service Package N | <Control Code> |
| 40 + N | Port Pin Control for Service Package N | <Port Mask> |
| 48 + N | Allow HBI Data for Service Package N | <Mute Mask> |
| 56 + N | Extend Group Code | <Group Code Extn.> |
| 64-255 | Reserved | |

| | No. of Bits |
|---|---|
| <Routing Code> | |
| Reserved | 2 |
| HBI Channel Code (ChA:0; CHB:1, etc) | 3 |
| Audio Output Code (Ch1:0, Ch2:1, etc) | 3 |
| <Control Code> | |
| Video Enable | 1 |
| Utility Data Enable | 1 |
| Separate Teletext Output Mode | 1 |
| Re-assigned Data Corrector Select | 1 |
| Teletext Page Select | 4 |
| <Port Mask> | |
| Port Pin Change Enable | 4 |
| Port Pin Output Bits | 4 |
| <Mute Mask> | |
| Reserved | 2 |
| Channel Mute Code | 6 |

In this Table <Command Code> is the decimal number corresponding to the 8-bit binary number transmitted as the commercial control command in packet C of the system data and <Command Data> specifies the 8-bit data item transmitted in the subsequent field of packet C. Thus, for example, if one wishes to assign group 19 to service package 3, i.e., N being 3, the binary numbers 00001011, 00010011 are transmitted. The first number is binary 11, i.e. the sum of 8+3, and the second is binary 19; that is, the command code is 8, meaning "assign group", the service package number is 3, and the group number is 19.

Following the definition of the command codes the Table defines the data items. For example, if 3 bits are provided for assignment of HBI channels by the routing code to data, 8 possibilities are permitted. Similarly, the control codes enable particular information portions of the composite B-MAC signal to be decoded; for example, if the first bit of the control code transmitted following the <General Control>command is "high", the decoder is enabled to display the video signal then being transmitted. If the second bit of the control code following the <General Control> is high, this enables decoding of the utility data and so on. The last four bits of the control code give the number of a teletext page for display, if assigned; this requires that the <General Control> be sent previously.

Overall it will be observed that the command codes include a start sequence and two command codes which assign and de-assign service package to and from the groups. The next four commands define audio assignments to service packages, provide general control, port pin control, and allow HBI channels to be used for data transmission. The seventh command, <extend group code>, allows use of group numbers in the range 256-65,536($2^8$-$2^{16}$). The port mask command defines which port pins are high and low; as discussed above, this allows remote control of various devices and the like. Finally, the mute mask control allows transmission of RS-232C data on HBI audio channels.

3. Buffering of Commands

As can be appreciated from the discussion above, it takes some time for the complete command control sequence to be transmitted and received. The commands are accordingly buffered until the START signal is received, whereupon all buffered commands take effect. However, this may include a delay of some time while important commands are not being executed. More particularly, authorization information transmitted to Commercial Decoders is buffered by the decoders until the Start Commercial Control Sequence command (START) is transmitted, at which time the buffered commands and implemented. Upon receipt of the START command, the information in the buffer is cleared in order to allow the authorization information in the next Commercial Control Sequence to update it correctly. Furthermore, the fact that the commands in effect are " changes" to existing commands means that some method must be provided to cause the decoders to take the proper status upon "power-up" (i.e. turning on) the decoder, at which time there is no command to be changed.

a. Double Buffering

In order to resolve these difficulties, a "doublebuffer" approach is adopted in a particularly preferred embodiment of the commercial decoder of the invention. A first "active" buffer contains the commands which are presently being executed and a second " standby" buffer stores a set of relevant commands transmitted by the system operator prior to their being needed. Upon receipt of a <swap> command, the two buffer contents are exchanged, and the new commands are then implemented immediately.

More particularly, three new synchronizing commands have been defined: Swap Active and Standby Buffers <swap>; Erase Standby Buffer <erase>; and Begin Command Sequence <begin>. The Start Command Sequence command is renamed Copy Standby Buffer to Active <copy>. Also added to the list of commands given above is the category called the Immediate Function Authorization <Immed> commands.

The Immediate and Buffered Function Authorization commands have the same effect except that the immediate commands are implemented by the decoders as soon as they are received, whereas the buffered commands are implemented only upon receiving either the <swap> or the <copy> command. Special consideration is given to the buffered text page request: although this is a buffered command, it does part of its function immediately, i.e., it issues a page grab request. The requested page is not displayed however until the required synchronizing command is received, so that it is referred to as a buffered command.

b. Command Sequences

In the same notation used above for describing the command functional groups, a typical command sequence described above is as follows:

<Copy><Assg><Buff><Copy><Assg><Buff>...

In this notation, <copy> is equivalent to <start>, while <Assg> refers to the assign/deassign commands described in the Table above, and <Buff> refers to the other commands listed in the Table.

The "Steady State" sequence of commands implementing double buffering looks like:

<Begin><Assg><Immed><Assg><Buff><Begin>...

Because the sequences here are punctuated with the <Begin> command, the only commands to take effect are the <Immed> commands. The <Buff> commands here are continuously loaded into the "Standby" buffer. Note that the <Idmed> commands are transditted primarily to allow decoders to recover correctly after changing channels, losing the signal or powering-on.

c. Bundles

In encoder computers of more than minimal sophistication (various levels being optional with system implementation), the operator has the ability to edit and store complete system configurations. One of these system configurations consists of up to eight Service Packages which are referred to here as "Bundles". The operator can create, change and delete Bundles. Bundles are referred to by name and may be listed in a directory. With regard to the current control strategy, the only relevant decoder-control operation an operator does to a Bundle is to put it on transmission.

The extension described above provides for the concepts of Active Bundle and Standby Bundle. The active Bundle describes the system configuration being accumulated by the decoders in temporary storage.

The following examples illustrate how the switching of Bundles appears in the control channel, i.e. illustrate the commands given by the operator to control the system configuration by way of the Bundles. In the following examples, whenever a digit appears in a command group, e.g.: <Assg0>, it refers to a Bundle number, so that the different bundles may be differentiated.

EXAMPLE 1

This example shows the steady-state operator control sequence when Bundle0 is Active and Bundle 1 is Standby:

<Begin><Assig0><Immed><Assg1><Buff-1><Begin>...

That is, Bundle 0 is to be effectuated immediately and Bundle 1 is to be stored for future use.

EXAMPLE 2

This example illustrates what happens in the channel when a "Shift Bundle 2 into Standby" command is executed by the operator. Notice that the <Copy> command only has to be synchronized to be in the right place in the session, i.e. the <Copy> command can replace any command after the decoders have received a complete Command Sequence, as in the above example 1. Also notice that immediately after the <Copy> command, Bundle 1 becomes the Active bundle and is then reproduced as the Immediate commands. Bundle 2 is thereafter transmitted and fills the standby Buffer, in preparation for the next <copy> command. When this occurs Bundle 0 is lost.

...<Command><Command><Command>...

<Copy><Assg1><Immed1><Assg2><Buff2><Begin>...

EXAMPLE 3

This is example shows what happens when the operator executes a "Shift Active Bundle into Standby" command while the steady state of example 1 exists. This is very similar to example 2 with the following exceptions: The <Swap> command causes decoders to save the Active bundle (number 0) as the Standby. Thereafter the contents of bundle 0 are downloaded in the Buffered commands.

...<Command><Command><Command>...

<Swap><Assg1><Immed1><Assg0><Buff0><Begin>...

EXAMPLE 4

This example shows what happens when the operator executes a "Write Bundle 2 into Standby" command given the steady state situation of example 1. The effect of the <Erase> command is to reset the Standby buffer to allow a different bundle to be loaded into it.

...<Command><Command><Command>...

<Erase><Assg0><Immed0><Assg2><Buff2><Begin>...

d. Power-Up

Because the double-buffered commands only refer to the "next" network configuration and because the time at which the "next" configuration comes into effect is unknown, no <copy> or <swap> command may be received to make the change indicated until the operator so directs. This may preclude reception for several minutes. Therefore, decoders which are not on-line, whether because they have simply lost synchronization, have been powered-down or otherwise, do not "know" the current network configuration and need a way of getting it. This is done by transmitting the Immediate commands, which include specification of the current service packages. A decoder which is powered-on, or which is not synchronized, then implements the immediate commands directed to it.

An underlying principle of the commercial control arrangement of the invention is that a decoder is deauthorized by default at the start of a command sequence and then builds its authorization profile from the commands it receives. In the Double Buffered scheme, each decoder de-authorizes on power-on or loss of synchronization. From there, the current and next service assignments, etc., are constructed in the decoder, after which they are not updated on a piecemeal basis. Further updating occurs when a <Copy> or <Erase> command is received, at which time the "next" assignment is implemented. The "next" buffer is then de-authorized, ready to receive more Buffered commands.

F. Decryption

Figure 21:
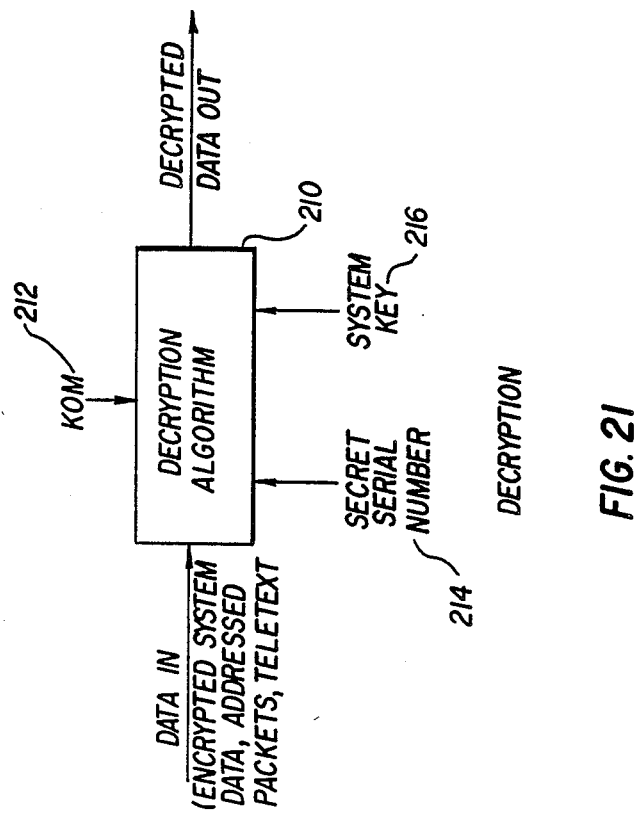
FIG. 21 shows generally the data decryption scheme according to the system of the invention.

Decryption is performed as indicated schematically in FIG. 21. The incoming data is supplied to a decryption algorithm as indicated at 210, as are one or more keys. The keys may comprise one of the several keys-of-the-month stored in EEPROM after supply to the decoder as part of an individually addressed packet, as noted at 212, the secret serial number sorted in the microprocessor at manufacture, as noted at 214, and/or the system key transmitted as part of the system data in line 3 of the VBI, as noted at 216.

The algorithm itself may comprise any one of a wide variety of decryption algorithms known to those of skill in the art, including that corresponding to the Data Encryption Standard ("DES") published by the National Bureau of Standards. The algorithm chosen is immaterial to the practice of the present invention. Suitable encryption techniques are similarly within the skill of the art. In the decoder, decryption is carried out most expediently in the microprogram processed by the microprocessor 114.

G. Further Advantages

The overall operation and design of the system of the invention having been described, and the decoder having been detailed, a number of additional aspects, objects, improvements and advantages of the system and decoder of the invention can now be explained more fully.

As discussed above, decryption of the complete B-MAC signal used according to this invention requires the secret serial number, which is written to the secure microprocessor at construction of the decoder, the service key, and the key-of-the-month. Probably the most vulnerable part of these is the key-of-the-month, which is transmitted frequently over a month's time. However, as noted, this capture of the KOM itself would not be adequate to decode the signal, since the service key and the secret serial number must also captured. Moreover, the service key is obsoleted every 16 frames (approximately every one-third second) such that capturing it will only itself allow loss of 16 frames. This also has the advantage that the time required for key acquisition following a channel change is limited to this period of time, e.g., one-third second. Therefore, the subscriber does not see a substantial delay when he changes channels on his decoder.

As mentioned above, there are in essence these types of control data transmitted according to the invention. A first type referred to as system data is intended for all users and is transditted in every 16-field cryptocycle. The system data contains information which fully describes the services currently being transmitted. These include such matters as broadcaster identification, program number, program cost, program tier membership required to view a given program, current service keys and so forth.

By comparison, the second type of control data, the addressed packets, are encrypted uniquely for an individual decoder, and contain individual-subscriber or user-specific information which fully describes the authorization of the decoder with respect to a specific broadcaster or broadcaster consortium for a given month. The addressed packets contain information such as consortium/broadcaster identification, message identification, authorized individual program numbers, authorized service tiers (text, audio, etc.), and credit updates.

According to the commercial control embodiment of the invention the assignment of individual decoders to groups is made by using the addressed packets. However, the service packets received by the groups are defined by the commercial control data, which is transmitted with the system data but over more than a single cryptocycle. As discussed in detail above, the commercial control data includes specification of a command, e.g. to reassign a particular service package, and includes a data portion which defines the group. Subsequent to this transmission each complete sequence of the commercial control data includes a command defining the service package which is to be assigned to the group.

This provides a third level of flexibility to the system, according to which individual decoders can readily be provided with differing services so that differing information can be transmitted thereto. All of this is completely under the control of the system transmitter. In each case the precise service required for the particular transmission of interest at the time can be made available, and in each case the system can be reconfigured freely as desired. Furthermore, note that individual decoders can belong to multiple groups for transmission of multiple services at varying times and that change in these group assignments at a given moment are performable simply at the instruction of the operator.

All types of control data packets are encryptable during transmission using a highly secure algorithm. They are only decoded in a secure microprocessor which cannot be tampered with without destruction. The products of decryption are also stored in the EE-PROM, which cannot be read, due to the construction of the secure microprocessor, detailed below. The contents of the system data packet, which specifies the on-air program tier, and the configuration of the commercial decoders and the services available to them, are then compared with the authorized tiers for the particular decoder (which are decrypted from an addressed packet transmitted on a monthly basis). The services which are authorized for reception by the decoder are derived from this comparison.

The microprocessor used according to the preferred embodiment of the invention is referred to as "secure." This is, for example, because it is logically necessary for a subscription-television decoder to have an element of physical security. That is, if an unauthorized unit can be modified to be identical to an authorized unit, then the system is insecure, and the broadcaster will lose revenue. Preferably, the only difference between an unauthorized unit and an authorized unit is in the contents of one or more memories. This is because it is highly desirable to avoid having to provide physically different microprocessors, etc., for individual decoders. This would be highly cost-inefficient.

It is essentially straightforward to protect services during transmission by encrypting the service keys and by rapidly changing the service keys in a random manner. The main security problem arises in protecting the service keys from compromise during distribution.

For that purpose, a device is required with the following characteristics:

(1) capable of highly sophisticated decryption techniques;
(2) factory programmable;
(3) immune to modification or copying; and
(4) including protected non-volatile memory.

It is now a routine operation to copy conventional custom integrated circuits, and companies exist which specialize in this activity. Therefore, a non-copyable device is required. In the embodiment of the decoder used in commercial application, e.g. for intercompany video communication and the like, the Motorola Model No. MC68705U5 is used. The Motorola No. MC68HC11 microprocessor, which is generally similar, and which was originally developed for use in automotive applications and the like, which also includes a protected internal non-volatile memory, is used for storage and processing of keys and credit information in the subscription television embodiment of the system of the invention described in detail above.

In a typical microprocessor, the address bus and data bus are available externally to be monitored and modified. Access can thereby be gained to the decryption process and to the contents of any memory connected to the bus. The processor used according to the present invention is operable in a secure mode in which the bus connection contacts are reassigned to other functions and in which the bus is not available externally for any purpose. In this condition, the internal non-volatile memory (the EEPROM) cannot be read by any known means. All input control packets can be securely encrypted. Decrypted service keys for the authorized services are released only for the microprocessor's immediate use, and are valid for only sixteen frames, that is, for approximately one-third second. Therefore, discovery of any particular decrypted service key is of minimal use. Within the microprocessor, the secure information is stored as a charge pattern and cannot be read, even using an electron microscope. The charge pattern is lost during any physical assault using probes.

As described above, the service data which is transmitted system-wide at cryptocycle intervals includes identification by service tier of the program currently being transmitted. The addressed packets, which are sent to each decoder from time to time, include tier identifications, indicating which programs the individual subscriber is authorized to view. This provides substantial flexibility in programming control and in billing, because each subscriber can separately select those programs which he wishes to view. The choice is effectively among literally hundreds of different programs to be made available by a broadcaster or a consortium of broadcasters.

While a preferred embodiment of the invention has been described in detail, this should not be taken as a limitation on the scope of the invention, but merely as exemplary thereof. Numerous additional improvements and modifications can be made to the system of the invention as described above without departure from its essential spirit and scope. Therefore, the present invention is not to be limited by the above disclosure, but only by the following claims.

We claim:

1. A communication system for use by a broadcaster to allocate a predetermined combination of services selected from a plurality of more than two different services including at least video and audio services transmitted simultaneously on a single frequency tuned channel to selectable groups of a plurality of decoders, comprising:

a transmitter located at a first location, the transmitter transmitting on the single frequency tuned channel a multiplexed analog components (MAC) composite signal, said composite signal comprising the plurality of the more than two different services and control data, a plurality of decoders located at second locations, the plurality of decoders comprising a receiver for receiving the transmitted composite signal, and the plurality of decoders further comprising a separator for separator said composite signal into information signals, said composite signal being of a predetermined format, said format comprising a continuing sequence of fields, each field comprising a predetermined number of lines, a portion of each of said lines operating as a horizontal blanking interval, a portion of each field operating as a vertical blanking interval and remaining portions of each field comprising video information signals, said control data of said composite signal comprising system-wide control commands, group decoder control commands and individual decoder control commands, said transmitter transmitting and said decoders receiving said system-wide control commands and said group decoder control commands in a first predetermined set of lines said portion of each field operating as said vertical blanking interval and said individual decoder control commands in a second predetermined set of lines in said portion of each field operating as said vertical blanking interval, said individual decoder control commands transmitted in said first predetermined set of line by the transmitter and received by said decoders for assigning individual decoders to one or more groups of decoders, said individual decoders assigned to one or more groups of decoders comprising a memory to store said group assignment, said transmitter capable of subsequently transmitting said group decoder control commands for allocating at least one service package to selected groups of said groups of decoders according to previous group assignments stored in their memories, said decoders assigned to one or more groups of decoders and allocated at least one service regardless of whether any portion of the composite signal is encrypted with a key, each said service package comprising a predetermine combination of services selected from said plurality of more than two different services including at least video and audio services transmitted in said composite signal.

2. The system of claim I wherein said control data of said composite signal further comprises re-assignment decoder control commands, the assignment of a decoder to a group of decoders being altered by said re-assignment decoder control commands transmitted in place of said individual decoder control commands.

3. The system of claim 1 wherein said service packages each comprise a predetermined combination of services selected from service providing portions of said composite signal comprising at least audio, video, teletext and utility data information signals transmitted in said composite signal.

4. The system of claim 1 wherein group decoder control commands in any one field of said composite signal relate to only a single group of decoders.

5. The system of claim 4 wherein group decoder control information providing commands to a given single group of decoders is transmitted repetitively over a plurality of sequential fields.

6. The system of claim 5 wherein group decoder control information providing a sequence of commands to a plurality of groups of decoders is transmitted sequentially over a plurality of groups of fields, and a complete sequence of such commands is preceded and followed by a START command.

7. The system of claim 6 wherein said decoders store commands directed at them and only execute said commands upon detection of a subsequent START command.

8. The system of claim 1 wherein certain of said commands are executed immediately upon detection by the decoders while other of said commands are only executed upon detection of a subsequent START command.

9. A method of communicating a multiplexed analog components (MAC) composite signal for use by a broadcaster to allocate a predetermined combination of services selected from a plurality of more than two different services including at least video and audio services simultaneously transmitted on a single frequency tuned channel to selectable groups of a plurality of decoders, comprising the steps of:

assembling and transmitting said multiplexed analog components (MAC) composite signal at a transmitter location, said transmitted composite signal comprising the plurality of the more than two different services and control data, and receiving and separating component information signals of said composite signal at one or more decoder locations, said transmitted composts signal being of a predetermined format comprising a number of fields transmitted at a fixed frequency, each of said fields comprising a predetermined number of lines, a portion of each of said lines operating as a horizontal blanking interval, a portion of each field operating as a vertical blanking interval and remaining portions of each field comprising a video portion, said control data of said transmitted composite signal comprising system-wide control commands, group decoder control commands and individual decoder control command, both said system-wide control commands and said group decoder control commands transmitted during a first predetermined set of lines in said portion of each field operating as the vertical blanking interval, the individual-decoder control commands transmitted during a second predetermined set of lines in said portion of each field operating as the vertical blanking interval, said transmitting and receiving steps being modified to include the steps of:

transmitting said individual decoder control commands in said first predetermined set of lines to assign individual decoders to one or more groups of decoders, storing said group assignments in a decoder memory, and transmitting said group decoder control commands to allocate at least one service package to selected groups of said groups of decoders, said decoders assigned to one or more groups of decoders and allocated to receive at least one service package regardless of whether any portion of the composite signal is encrypted with a key, each said service package comprising a predetermined combination of services selected from said plurality of more than two different services including at least video and audio services transmitted in said composite signal.

10. The system of claim 1 wherein said plurality of more than two different services further comprises utility data services transmitted in said composite signal.

11. The system of claim 1 wherein said plurality of more than two different services further comprises teletext services.

12. The system of claim 1 wherein said individual decoder commands are transmitted repetitively at relatively short intervals and said group decoder control commands are transmitted repetitively at relatively intermediate intervals.

13. The system of claim 1 wherein said control data of said composite signal further comprises an audio control command for defining audio service for a previously assigned service package comprising audio services, the service package being assigned to a group of decoders by said group decoder control command.

14. The method of claim 9 wherein the decoders of said system are assigned to groups, each group having a unique group code, each group decoder control command being addressed to a single group and only group decoder control commands addressed to a signal group being transmitted during transmission of a single complete set of said system-wide and group decoder control commands.

15. The method of claim 9 wherein said group decoder and system-wide and individual-decoder control commands each comprise a predetermined number of digital bits, said bits being transmitted at a substantially constant rate, the bits of a complete set of group decoder and system-wide control commands being transmitted in more than one single line, and different portions of a given complete set of group decoder and system-wide control commands being transmitted in single lines of plural fields.

16. The method of claim 15, wherein said group decoder control commands and said system-wide control commands comprise plural packets of data, said group decoder control commands being transmitted as part of one of the plural packets of said data.

17. The method of claim 9 said decoders being assigned membership in one or more groups of decoders and said group decoder control commands being transmitted together with identification of a single selected group to which a particular service package is allocated.

18. The method of claim 17 wherein a complete sequence of transmission of group decoder control commands is preceded and followed by a START transmission marking the ends of the sequence.

19. The method of claim 17 wherein in the event said service packages comprise audio services, said control data further includes audio control commands particularly defining audio services.

20. The method of claim 17 said control data of said composite signal further comprises reassignment decoder control commands for altering said assignments to groups in place of said individual-decoder control commands.

21. The method of claim 17 wherein said system-wide control commands and said group decoder control commands are encoded and comprise a number of data packets such that they cannot be transmitted during a single frame but are transmitted over a plurality of frames.

22. The method of claim 21 wherein a complete set of system wide control commands is transmitted during transmission of a fixed number of frames, and wherein said group decoder control commands are transmitted each frame.

23. The method of claim 21 wherein a complete sequence of transmission of the group decoder control commands is preceded by and followed by a signal signifying the ends of the sequence.

24. A communication system for use by a broadcaster to allocate a predetermined combination of services selected from a plurality of different services transmitted simultaneously on a single frequency tuned channel to selectable groups of a plurality of decoders, comprising:

a transmitter located at a first location, the transmitter transmitting on the single frequency tuned channel a multiplexed analog components (MAC) composite signal;

said composite signal comprising a plurality of three or more different services and control data;

a plurality of decoders located at second locations, the plurality of decoders comprising a receiver for receiving the transmitted composite signal, and the plurality of decoders further comprising a separator for separating said composite signal into component information signals;

said composite signal being of a predetermined format, said format comprising a continuing sequence of fields, each field comprising a predetermined number of lines, a portion of each of said lines operating as a horizontal blanking interval, a portion of each field operating as a vertical blanking interval and remaining portions of each field comprising video information signals;

said control data of said composite signal comprising system-wide control commands, group decoder control commands and individual decoder control commands, said transmitter transmitting and said decoders receiving said system-wide control commands and said group decoder control commands in a first predetermined set of lines in said portion of each field operating as said vertical blanking interval and said individual decoder control commands in a second predetermined set of lines in said portion of each field operating as said vertical blanking interval, said individual decoder control commands transmitted in said first predetermined set of lines by the transmitter add received by said decoders for assigning individual decoders to one or more groups of decoders;

said individual decoders assigned to one or more groups of decoders comprising a memory to store said group assignment, said transmitter capable of subsequently transmitting said group decoder control commands for allocating at least one service package to selected groups of said groups of decoders according to previous group assignments stored in their memories;

said decoders assigned to one or more groups of decoders and allocated at least one service package regardless of whether any portion of the composite signal is encrypted with a key, each said service package comprising a predetermined combination of three or more different services selected from at least video service, audio services, teletext services and utility data services transmitted in said multiplexed analog components (MAC) composite signal on said single frequency tuned channel.

25. A method of communicating a multiplexed analog components (MAC) composite signal for use by a broadcaster to allocate a predetermined combination of services selected from a plurality of different services simultaneously transmitted on a single frequency tuned channel to selectable groups of a plurality of decoders, comprising the steps of:

assembling and transmitting said multiplexed analog components (MAC) composite signal at a transmitter location, said transmitted composite signal comprising a plurality of three or more different services and control data; and receiving and separating component information signals of said composite signal at one or more decoder locations, said transmitted composite signal being of a predetermined format comprising a number of fields transmitted at a fixed frequency, each of said fields comprising a predetermined number of lines, a portion of each of said lines operating as a horizontal blanking interval, a portion of each field operating as a vertical blanking interval and remaining portions of each field comprising a video portion;

said control data of said transmitted composite signal comprising system-wide control commands, group decoder control commands and individual decoder control commands, both said system-wide control commands and said group decoder control commands transmitted during a first predetermined set of lines in said portion of each field operating as the vertical blanking interval, the individual-decoder control commands transmitted during a second predetermined set of lines in said portion of each field operating as the vertical blanking interval, said transmitting and receiving steps being modified to include the steps of:

transmitting said individual decoder control commands in said first predetermined set of lines to assign individual decoders to one or more groups of decoders storing said group assignments in a decoder memory; and transmitting said group decoder control commands to allocate at least one service package to selected groups of said groups of decoders;

said decoders assigned to one or more groups of decoders and allocated receive at least one service package regardless of whether any portion of th composition signal is encrypted with a key, each said service package comprising a predetermined combination of three or more different services selected of from at least video services, audio services, teletext services and utility services transmitted in said multiplexed analog components (MAC) composite signal on said single frequency tuned channel.

* * * * *

UNITED STATES PATENT AND TRADEMARK OFFICE
CERTIFICATE OF CORRECTION

PATENT NO. : 4,866,770
DATED : September 12, 1989
INVENTOR(S) : Nigel Seth-Smith et al.

It is certified that error appears in the above-identified patent and that said Letters Patent is hereby corrected as shown below:

At column 41, line 28, "separator" should read -- separating --.
At column 41, line 44, "lines said" should read -- lines in said --.
At column 41, line 66, "predetermine" should read -- predetermined --.
At column 42, line 52, "composts" should read -- composite --.

Signed and Sealed this

Twenty-first Day of September, 1993

Attest:

BRUCE LEHMAN

Attesting Officer  Commissioner of Patents and Trademarks